United States Patent
Sun et al.

(10) Patent No.: US 12,047,445 B2
(45) Date of Patent: Jul. 23, 2024

(54) APPLICATION INTERFACE MIGRATION SYSTEM AND METHOD, AND RELATED DEVICE

(71) Applicant: Huawei Technologies Co., Ltd., Guangdong (CN)

(72) Inventors: Fei Sun, Hangzhou (CN); Yonghui Wu, Hangzhou (CN); Litao Yu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/043,157

(22) PCT Filed: Aug. 3, 2021

(86) PCT No.: PCT/CN2021/110392
§ 371 (c)(1),
(2) Date: Feb. 27, 2023

(87) PCT Pub. No.: WO2022/042233
PCT Pub. Date: Mar. 3, 2022

(65) Prior Publication Data
US 2023/0362244 A1    Nov. 9, 2023

(30) Foreign Application Priority Data

Aug. 31, 2020   (CN) .......................... 202010898935.1

(51) Int. Cl.
*H04L 67/1095*    (2022.01)

(52) U.S. Cl.
CPC ............................... *H04L 67/1095* (2013.01)

(58) Field of Classification Search
CPC .................................................... H04L 67/1095
See application file for complete search history.

(56) References Cited

U.S. PATENT DOCUMENTS

| | | | |
|---|---|---|---|
| 7,703,032 B2 | 4/2010 | Wells | |
| 8,229,888 B1 | 7/2012 | Roskind et al. | |
| 2013/0055323 A1 | 2/2013 | Venkitaraman et al. | |
| 2013/0086529 A1* | 4/2013 | Singh | G06F 9/461 715/854 |
| 2013/0332846 A1* | 12/2013 | Freedman | G06F 9/449 715/745 |
| 2014/0280580 A1 | 9/2014 | Langlois et al. | |

(Continued)

FOREIGN PATENT DOCUMENTS

| | | |
|---|---|---|
| CN | 102272747 A | 12/2011 |
| CN | 102932520 A | 2/2013 |

(Continued)

*Primary Examiner* — Gil H. Lee
(74) *Attorney, Agent, or Firm* — WOMBLE BOND DICKINSON (US) LLP

(57) ABSTRACT

An application interface migration method includes: receiving the recovery instruction by using a second distributed service; generating a recovery routing stack based on the page routing data, and load a first page based on the recovery routing stack and a current page routing stack; checking the UI binding data based on a declaration field corresponding to scenario information; storing the UI binding data in a shared data segment of a target application if the check succeeds; and refreshing a component view of the first page.

14 Claims, 18 Drawing Sheets

(56) References Cited

U.S. PATENT DOCUMENTS

| | | | |
|---|---|---|---|
| 2015/0095854 A1* | 4/2015 | Olenick | ................ G06F 3/0488 |
| | | | 715/853 |
| 2018/0107343 A1 | 4/2018 | Mills et al. | |
| 2019/0190968 A1 | 6/2019 | Ma | |

FOREIGN PATENT DOCUMENTS

| | | |
|---|---|---|
| CN | 102939579 A | 2/2013 |
| CN | 102985922 A | 3/2013 |
| CN | 103003797 A | 3/2013 |
| CN | 103229153 A | 7/2013 |
| CN | 106792442 A | 5/2017 |
| CN | 107943439 A | 4/2018 |
| CN | 109646940 A | 4/2019 |
| CN | 110658963 A | 1/2020 |

* cited by examiner

Second electronic device

APPLICATION INTERFACE MIGRATION SYSTEM AND METHOD, AND RELATED DEVICE

CROSS-REFERENCE TO RELATED APPLICATIONS

This application is a National Stage of International Application No. PCT/CN2021/110392, filed on Aug. 3, 2021, which claims priority to Chinese Patent Application No. 202010898935.1, filed on Aug. 31, 2020, both of which are hereby incorporated by reference in their entireties.

TECHNICAL FIELD

This application relates to the field of terminal technologies, and in particular, to an application interface migration system and method, and a related device.

BACKGROUND

With development of mobile terminals, a plurality of electronic devices may cooperate with each other, to perform seamless migration of a user interface (UI) state. For example, an email with half of content edited on a mobile phone can be seamlessly connected to a nearby computer with a same account, so that the unfinished email can be continued on the computer, which greatly improves user experience.

In the conventional technology, there are mainly two UI state migration mechanisms. One is a Handoff-based migration mechanism, which is centered on iCloud and has low migration efficiency. The other is a Liquid JS (JavaScript) framework-based migration mechanism, which requires serialization of complete component information during migration and strongly depends on a central server.

It can be learned that the existing UI state migration mechanisms depend on the server, and have low migration efficiency.

SUMMARY

Embodiments of this application disclose an application interface migration system and method, and a related device, to resolve problems in the conventional technology that UI state migration mechanisms all strongly depend on a server and migration efficiency is low.

In some embodiments, an application interface migration system is disclosed, and the application interface migration system includes a first electronic device and a second electronic device. The first electronic device is configured to: generate a migration instruction for a target application by using a first distributed service, where the migration instruction is used to indicate to migrate a user interface UI state of the target application to the second electronic device; in response to the migration instruction, select UI binding data from a shared data segment of the target application based on scenario information of the first electronic device, where data in the shared data segment is used for migration of the UI state, and the UI binding data is bound to a component of the target application; obtain page routing data of the target application; process the UI binding data and the page routing data to obtain to-be-migrated data; and send, to the second electronic device by using the first distributed service, a recovery instruction that carries the to-be-migrated data. The second electronic device is configured to: receive the recovery instruction by using a second distributed service, where the recovery instruction is used to indicate to recover the UI state of the target application on the second electronic device, the recovery instruction carries the to-be-migrated data, and the to-be-migrated data includes the page routing data and the UI binding data; in response to the recovery instruction, generate a recovery routing stack based on the page routing data, and load a first page based on the recovery routing stack and a current page routing stack of the second electronic device; check compatibility of the UI binding data based on a declaration field corresponding to scenario information of the second electronic device; store the UI binding data in the shared data segment of the target application if the compatibility of the UI binding data is successfully checked; and refresh a component view that is on the first page and that is related to the UI binding data.

In this application, the first electronic device and the second electronic device communicate with each other by using the distributed service without strongly depending on a service center. Based on point-to-point transmission, efficiency of following page migration can be improved. In addition, before the migration is initiated, the data in the shared data segment is effectively selected based on the scenario information of the first electronic device, so that an amount of transmitted data can be reduced. In an entire process, complete UI component information does not need to be serialized, so that a migration speed is faster. Before recovering data, the second electronic device performs integrity check on the data, to ensure that the data is not tampered with, and ensure normal recovery of the data. Page recovery is performed based on the recovery routing stack and the current page routing stack, so that seamless migration and recovery of a page between two routing stacks can be ensured, and a mechanism of associated management between a recovery route and an original route is implemented. In the entire migration process, point-to-point migration of a UI component on different electronic devices is implemented.

In some embodiments, an application interface migration method is disclosed, applied to a first electronic device. The application interface migration method includes: generating a migration instruction for a target application by using a first distributed service, where the migration instruction is used to indicate to migrate a user interface UI state of the target application to a second electronic device; in response to the migration instruction, selecting UI binding data from a shared data segment of the target application based on scenario information of the first electronic device, where data in the shared data segment is used for migration of the UI state, and the UI binding data is bound to a component of the target application; obtaining page routing data of the target application; processing the UI binding data and the page routing data to obtain to-be-migrated data; and sending, to the second electronic device by using the first distributed service, a recovery instruction that carries the to-be-migrated data, where the recovery instruction is used to indicate to recover the UI state of the target application on the second electronic device.

The processing performed on the UI binding data and the page routing data includes but is not limited to serialization, compression, and encryption. The first electronic device and the second electronic device communicate with each other by using the distributed service without strongly depending on a service center. Based on point-to-point transmission, efficiency of following page migration can be improved. In addition, before the migration is initiated, the data in the shared data segment is effectively selected based on the scenario information of the first electronic device, so that an amount of transmitted data can be reduced, and complete UI component information does not need to be serialized, so that a migration speed is faster.

In some embodiments, the generating a migration instruction for a target application by using a first distributed service includes: selecting, from surrounding devices of the first electronic device by using the first distributed service, a plurality of candidate devices on which UI state migration can be performed; receiving a selection instruction entered for the plurality of candidate devices, and determining the second electronic device from the plurality of candidate devices according to the selection instruction; determining whether a target application currently displayed in the first electronic device has permission for the UI state migration; and if the target application currently displayed in the first electronic device has the permission for the UI state migration, generating the migration instruction based on the target application and the second electronic device.

Networking is performed based on the distributed service, the candidate device that can be migrated is searched for, the migration instruction is generated based on the permission for the UI state migration of the target application, and point-to-point communication is implemented. In some embodiments, after the obtaining page routing data of the target application, the application interface migration method further includes: obtaining component state data of the target application; and the processing the UI binding data and the page routing data to obtain to-be-migrated data includes: processing the UI binding data, the page routing data, and the component state data, to obtain the to-be-migrated data.

The component state data is private state data of a component, for example, a focus state and a scrolling position state of the component.

In some embodiments, an application interface migration method is disclosed, and applied to a second electronic device. The application interface migration method includes: receiving a recovery instruction by using a second distributed service, where the recovery instruction is used to indicate to recover a user interface UI state of a target application on the second electronic device, the recovery instruction carries to-be-migrated data, the to-be-migrated data includes page routing data and UI binding data, and the UI binding data is bound to a component of the target application; in response to the recovery instruction, generating a recovery routing stack based on the page routing data, and loading a first page based on the recovery routing stack and a current page routing stack of the second electronic device; checking compatibility of the UI binding data based on a declaration field corresponding to scenario information of the second electronic device; and storing the UI binding data in a shared data segment of the target application if the compatibility of the UI binding data is successfully checked; and refreshing a component view that is on the first page and that is related to the UI binding data.

In this application, the second electronic device receives, by using the distributed service, the recovery instruction sent by a first electronic device. Before recovering data, the second electronic device performs integrity check on the data, to ensure that the data is not tampered with, and ensure normal recovery of the data. Page recovery is performed based on the recovery routing stack and the current page routing stack, so that seamless migration and recovery of a page between two routing stacks can be ensured, and a mechanism of associated management between a recovery route and an original route is implemented.

In some embodiments, the to-be-migrated data further includes component state data, and after the storing the UI binding data in a shared data segment of the target application, the application interface migration method further includes: determining a target component corresponding to the component state data in the target application; recovering the component state data to the target component; and the refreshing a component view that is on the first page and that is related to the UI binding data includes: refreshing, on the first page, a component view related to the UI binding data and the target component.

A migratable attribute and a component identifier of private state data of a component may be preset. According to the setting, when migration occurs, a component may be located based on the component identifier, and the component state data may be recovered to the component, to satisfy a requirement of differentiated display of a same application on interfaces of different devices and improve a view effect.

In some embodiments, the checking compatibility of the UI binding data based on a declaration field corresponding to scenario information of the second electronic device includes: obtaining the declaration field corresponding to the scenario information of the second electronic device; determining whether the UI binding data is valid data declared in the declaration field; and if the UI binding data is the valid data declared in the declaration field, determining that the compatibility of the UI binding data is successfully checked.

The compatibility check can avoid a case in which migration fails because versions of the target application on the first electronic device and the target application on the second electronic device are different.

In some embodiments, after the loading a first page, the application interface migration method further includes: checking integrity of the UI binding data; if the integrity of the UI binding data is successfully checked, performing the operation of checking compatibility of the UI binding data based on a declaration field corresponding to scenario information of the second electronic device; and the storing the UI binding data in a shared data segment of the target application if the compatibility of the UI binding data is successfully checked includes: if the compatibility of the UI binding data is successfully checked, determining a UI component bound to the shared data segment of the target application; obtaining a first data type required by the UI component; determining whether the first data type is consistent with a second data type of the UI binding data; and storing the UI binding data in the shared data segment of the target application if the first data type is consistent with the second data type of the UI binding data.

Before data recovery is performed, the integrity check needs to be performed first to ensure that the data is not tampered with. Then, the compatibility check further needs to be performed to ensure that the version of the target application on the first electronic device is compatible with the version of the target application on the second electronic device. Finally, the data type further needs to be checked, to ensure that data types required by the UI component are consistent and following recovery can be performed properly.

In some embodiments, the loading a first page based on the recovery routing stack and a current page routing stack of the second electronic device includes: obtaining first routing data at the top of the recovery routing stack, and moving the first routing data to the top of the current page routing stack of the second electronic device; and loading the first page based on the first routing data of the current page routing stack.

Page recovery is performed based on the recovery routing stack and the current page routing stack, so that seamless migration and recovery of a page between two routing stacks can be ensured, and a mechanism of associated management between a recovery route and an original route is implemented.

In some embodiments, the application interface migration method further includes: receiving a back instruction for the first page; in response to the back instruction, determining whether the recovery routing stack is empty; if the recovery routing stack is not empty, obtaining second routing data at the top of the recovery routing stack, and moving the second routing data to the top of the current page routing stack of the second electronic device; and loading a second page based on the second routing data of the current page routing stack.

When a user needs to return to a current page, the user may preferably check whether the routing data still exists in the recovery routing stack, and if the routing data still exists in the recovery routing stack, the user preferably loads a corresponding page, to implement seamless migration of a plurality of pages loaded on the first electronic device to the second electronic device, and improve user experience.

In some embodiments, the application interface migration method further includes: if the recovery routing stack is empty, obtaining third routing data at the top of the current page routing stack; and loading a third page based on the third routing data of the current page routing stack.

If the recovery routing stack is empty, the routing data in the current page routing stack may be loaded, and a corresponding page is loaded, to implement a mechanism of associated management between a recovery route and an original route.

In some embodiments, an electronic device is disclosed, including a processor and a memory. The memory is configured to store instructions, and the processor is configured to invoke the instructions in the memory, so that the electronic device performs the application interface migration method.

In some embodiments, a computer-readable storage medium is disclosed. The computer-readable storage medium stores at least one instruction, and when the at least one instruction is executed by a processor, the application interface migration method is implemented.

In some embodiments, a sixth aspect of this application discloses an application interface migration apparatus. The application interface migration apparatus runs in a first electronic device, the application interface migration apparatus includes a plurality of functional modules, and the plurality of functional modules are configured to perform the application interface migration method.

In some embodiments, a seventh aspect of this application discloses an application interface migration apparatus. The application interface migration apparatus runs in a second electronic device, the application interface migration apparatus includes a plurality of functional modules, and the plurality of functional modules are configured to perform the application interface migration method.

In addition, for technical effects brought by the fourth aspect to the seventh aspect, refer to the related descriptions in the designs in the foregoing methods. Details are not described herein again.

BRIEF DESCRIPTION OF DRAWINGS

FIG. 7B-1 to FIG. 7B-4 are schematic diagrams of an interface of page migration according to some embodiments of the present disclosure;

FIG. 7C-1 to FIG. 7C-3 are schematic diagrams of an interface of page migration according to some embodiments of the present disclosure;

FIG. 9A-1 and FIG. 9A-2 are schematic diagrams of an interface of data migration according to some embodiments of the present disclosure.

DESCRIPTION OF EMBODIMENTS

The following describes embodiments of the present disclosure with reference to accompanying drawings in embodiments of the present disclosure.

To better understand an application interface migration system and method, and a related device disclosed in embodiments of the present disclosure, the following first describes a network architecture to which embodiments of the present disclosure are applicable.

Figure 1:
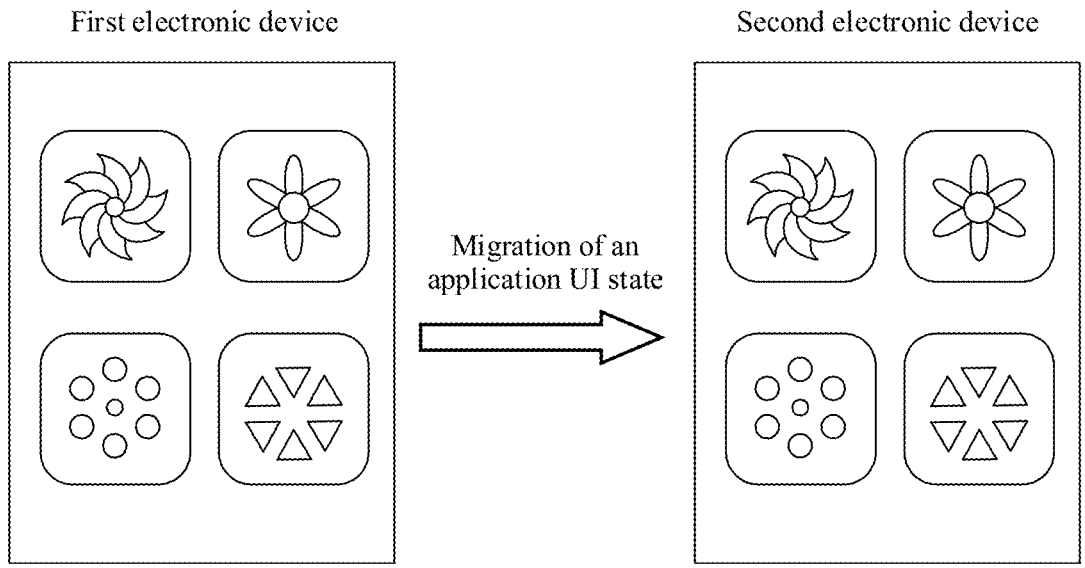
FIG. 1 is a schematic diagram of migrating an application interface between a plurality of devices according to some embodiments of the present disclosure.

FIG. 1 is a schematic diagram of a scenario of migrating an application interface between a plurality of devices according to some embodiments of the present disclosure. As shown in FIG. 1, a first electronic device and a second electronic device are included. The first electronic device may include but is not limited to: a personal computer, a tablet computer, a smartphone, and a personal digital assistant PDA. The second electronic device may include but is not limited to, a personal computer, a tablet computer, a smartphone, and a personal digital assistant PDA. In FIG. 1, a user interface (UI) state on the first electronic device may be migrated to the second electronic device, to implement seamless migration of the user interface (UI) between a plurality of devices. The first electronic device and the second electronic device may be electronic devices of a same type, or may be electronic devices of different types. For example, both the first electronic device and the second electronic device are mobile phones, or the first electronic device is a mobile phone, and the second electronic device is a computer.

Figure 2:
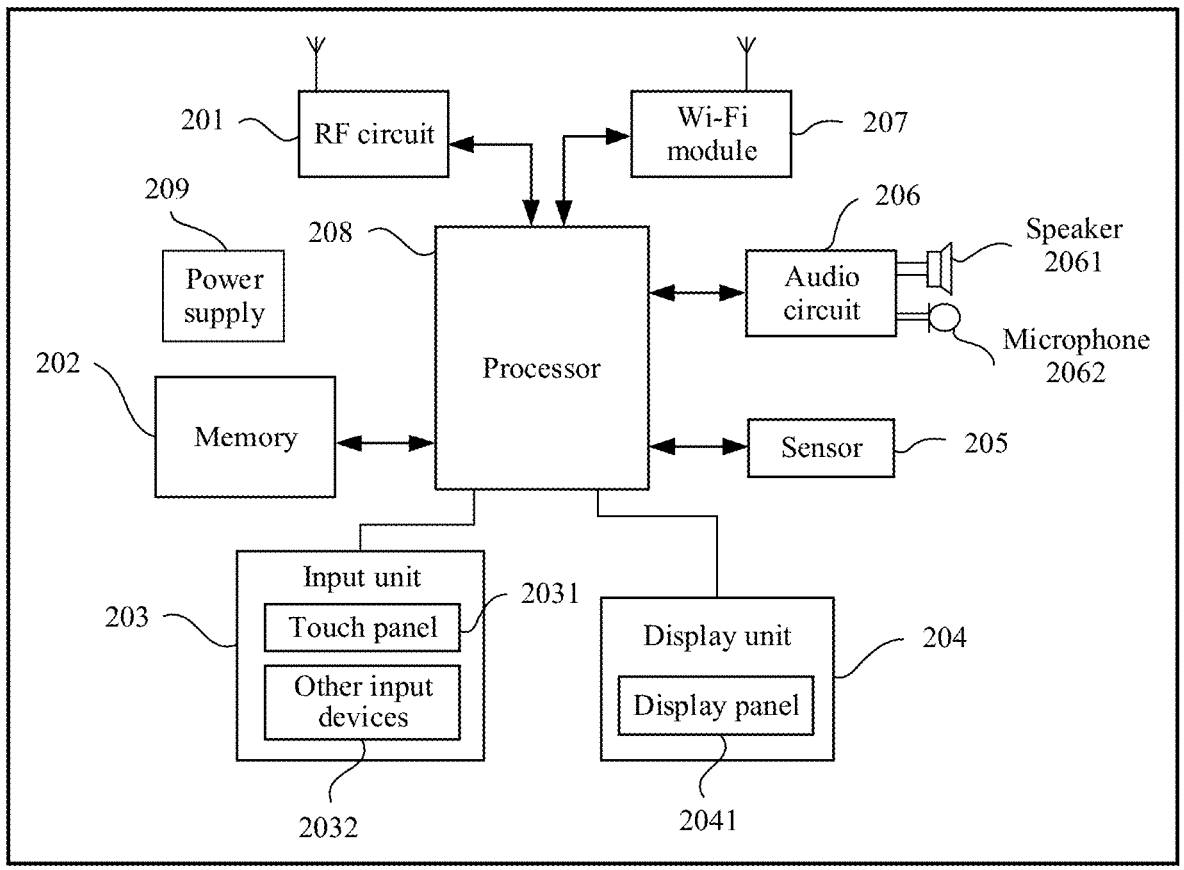
FIG. 2 is a schematic diagram of a hardware structure of an electronic device according to some embodiments of the present disclosure.

FIG. 2 is a schematic diagram of a hardware structure of an electronic device according to some embodiments of the present disclosure. The electronic device shown in FIG. 2 may be the first electronic device in FIG. 1, or may be the second electronic device in FIG. 1. As shown in FIG. 2, the electronic device may include components such as a radio frequency (RF) circuit 201, a memory 202, an input unit 203, a display unit 204, a sensor 205, an audio circuit 206, a wireless fidelity (Wi-Fi) module 207, a processor 208, and a power supply 209. A person skilled in the art may understand that the structure of the mobile phone shown in FIG. 2 does not constitute a limitation on the mobile phone, and the mobile phone may include more or fewer components than those shown in the figure, or combine some components, or have different component arrangements The RF circuit 201 may be configured to receive and send signals in a process of receiving and sending information or in a call process. Particularly, after receiving downlink information of a base station, the RF circuit 201 delivers the downlink information to the processor 208 for processing, and sends uplink data to the base station. Usually, the RF circuit 201 includes but is not limited to an antenna, at least one amplifier, a transceiver, a coupler, a low noise amplifier (LNA), a duplexer, and the like.

The memory 202 may be configured to store a software program and a module. The processor 208 runs the software program and the module stored in the memory 202, to perform various function applications of the electronic device and data processing. The memory 202 may mainly include a program storage area and a data storage area. The program storage area may store an operating system, an application required by at least one function (such as a sound playback function or an image playback function), and the like. The data storage area may store data (such as audio data or an address book) created based on use of the electronic device, and the like. In addition, the memory 202 may include a high-speed random access memory, or may further include a nonvolatile memory, for example, at least one magnetic disk storage device, a flash memory, or another volatile solid-state storage device.

The input unit 203 may be configured to: receive input digital or character information, and generate a key signal input related to a user setting and function control of the electronic device. Specifically, the input unit 203 may include a touch panel 2031 and other input devices 2032. The touch panel 2031, also referred to as a touchscreen, may collect a touch operation (for example, an operation performed by a user on the touch panel 2031 or near the touch panel 2031 by using any proper object or accessory such as a finger or a stylus) performed by the user on or near the touch panel 2031, and drive a corresponding connection apparatus based on a preset program. Optionally, the touch panel 2031 may include two parts: a touch detection apparatus and a touch controller. The touch detection apparatus detects a touch orientation of the user, detects a signal generated by the touch operation, and transfers the signal to the touch controller. The touch controller receives touch information from the touch detection apparatus, converts the touch information into contact coordinates, then sends the contact coordinates to the processor 208, and can receive a command sent from the processor 208 and execute the command. In addition, the touch panel 2031 may be implemented by using a plurality of types, such as a resistive type, a capacitive type, an infrared type, and a surface acoustic wave type. In addition to the touch panel 2031, the input unit 203 may further include the other input devices 2032. Specifically, the other input devices 2032 may include but are not limited to one or more of a physical keyboard, a function key (such as a volume control key or an on/off key), a trackball, a mouse, and a joystick.

The display unit 204 may be configured to display information entered by the user or information provided for the user, and various menus of the electronic device. The display unit 204 may include a display panel 2041. Optionally, the display panel 2041 may be configured in a form of a liquid crystal display (LCD), an organic light-emitting diode (OLED), or the like. Further, the touch panel 2031 may cover the display panel 2041. When detecting the touch operation on or near the touch panel 2031, the touch panel 2031 transfers the touch operation to the processor 208 to determine a type of a touch event, and then the processor 208 provides a corresponding visual output on the display panel 2041 based on the type of the touch event. Although the touch panel 2031 and the display panel 2041 are used as two independent components in FIG. 2 to implement input and output functions of the electronic device, in some embodiments, the touch panel 2031 and the display panel 2041 may be integrated to implement the input and output functions of the electronic device.

The electronic device may further include at least one sensor 205, for example, a light sensor, a motion sensor, and another sensor. Specifically, the light sensor may include an ambient light sensor and a proximity sensor. The ambient light sensor may adjust luminance of the display panel 2041 based on brightness of ambient light. The proximity sensor may turn off the display panel 2041 and/or backlight when the electronic device moves to an ear. As a motion sensor, an accelerometer sensor may detect values of acceleration in all directions (usually, three axes), may detect a value and a direction of gravity when the accelerometer sensor is static, and may be used in an application for recognizing a posture (such as switching between landscape mode and portrait mode, a related game, or magnetometer posture calibration) of the electronic device, a function related to vibration recognition (such as a pedometer or a knock), or the like. In addition, another sensor such as a gyro, a barometer, a hygrometer, a thermometer, or an infrared sensor may be further disposed on the electronic device, details are not described herein.

The audio circuit 206, a speaker 2061, and a microphone 2062 may provide an audio interface between the user and the electronic device. The audio circuit 206 may convert received audio data into an electrical signal and then transmit the electrical signal to the speaker 2061, and the speaker 2061 converts the electrical signal into a sound signal for output. In addition, the microphone 2062 converts a collected sound signal into an electrical signal. The audio circuit 206 receives the electrical signal, converts the electrical signal into audio data, and then outputs the audio data to the processor 208 for processing, to send the audio data to, for example, another electronic device through the RF circuit 201, or outputs the audio data to the memory 202 for further processing.

Wi-Fi belongs to a short distance wireless transmission technology. The electronic device may help, by using the Wi-Fi module 207, the user receive and send emails, browse a web page, access streaming media, and the like. The Wi-Fi module 207 provides wireless broadband internet access for the user. Although FIG. 2 shows the Wi-Fi module 207, it may be understood that the Wi-Fi module 207 is not a mandatory component of the electronic device, and may be omitted based on a requirement without changing the essence of the present disclosure.

The processor 208 is a control center of the electronic device. The processor 208 is connected to all parts of the entire electronic device by using various interfaces and lines, and performs various functions of the electronic device and data processing by running or executing the software program and/or the module stored in the memory 202 and invoking data stored in the memory 202, to perform overall monitoring on the electronic device. Optionally, the processor 208 may include one or more processing units. Preferably, an application processor and a modem processor may be integrated into the processor 208. The application processor mainly processes an operating system, a user interface, an application, and the like. The modem processor mainly processes wireless communication. It may be understood that the modem processor may not be integrated into the processor 208.

The electronic device further includes the power supply 209 (for example, a battery) that supplies power to the components. Optionally, the power supply may be logically connected to the processor 208 by using a power management system, to implement functions such as charge management, discharge management, and power consumption management by using the power management system.

Although not shown in the figure, the electronic device may further include a camera, a Bluetooth module, and the like, and details are not described herein.

Figure 3:
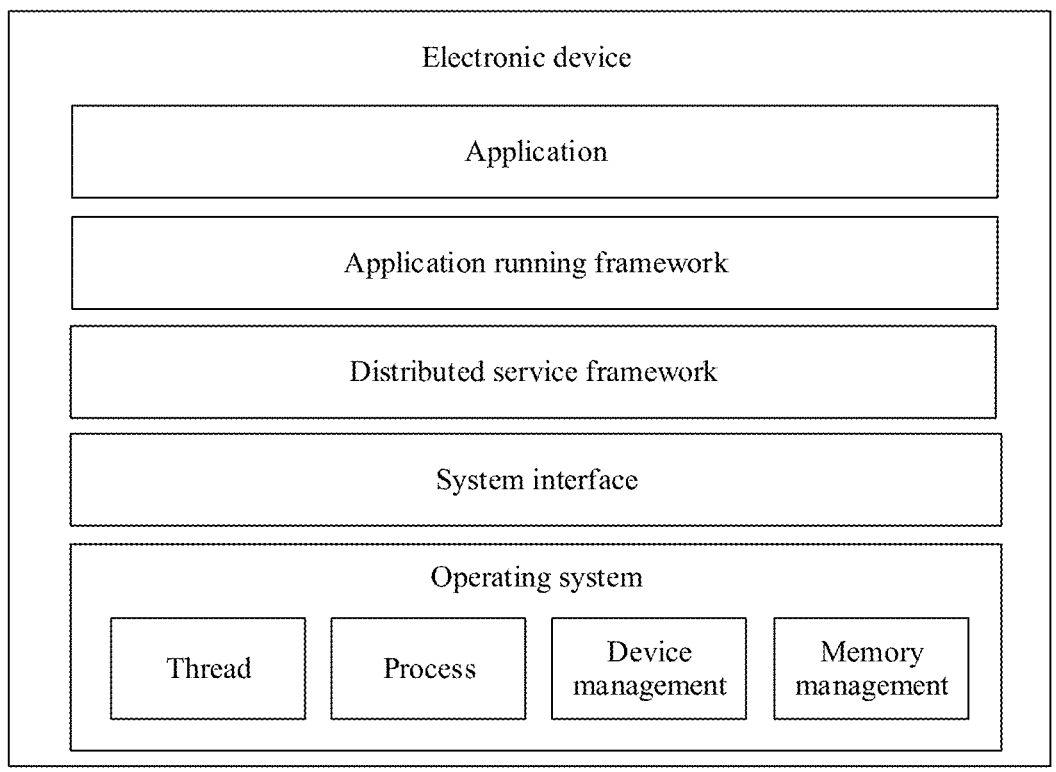
FIG. 3 is a schematic diagram of a running environment for application interface migration according to some embodiments of the present disclosure.

FIG. 3 is a schematic diagram of a running environment for application interface migration according to some embodiments of the present disclosure. As shown in FIG. 3, there are mainly three layers: an operating system, a system interface, a distributed service framework, an application running framework, and an application from bottom to top.

The operating system provides basic functions such as memory management and device management on an electronic device, provides basic units such as a thread and a process, and further provides infrastructure for running the application.

The system interface provides a basic interface and a basic library for running the application, and a virtual machine that can run a high-level language.

The distributed service framework provides basic distributed capabilities, such as distributed networking, device discovery, device capability query, migration initiation, and status management. The distributed service framework is a basis for implementing UI state migration.

The application running framework may provide capabilities such as an application running environment, component rendering, and data binding. Core processing logic of a page routing migration mechanism, a data binding migration mechanism, and a migration mechanism of a UI component private state is implemented at this layer.

At the application layer, service logic and a UI can be developed based on the provided application running framework. The standard MVVM (Model-View-View Model) mode is used as a development mode. Data and the UI are separated, and only service data needs to be focused on, that is, UI migration is supported at the application layer.

Figure 4:
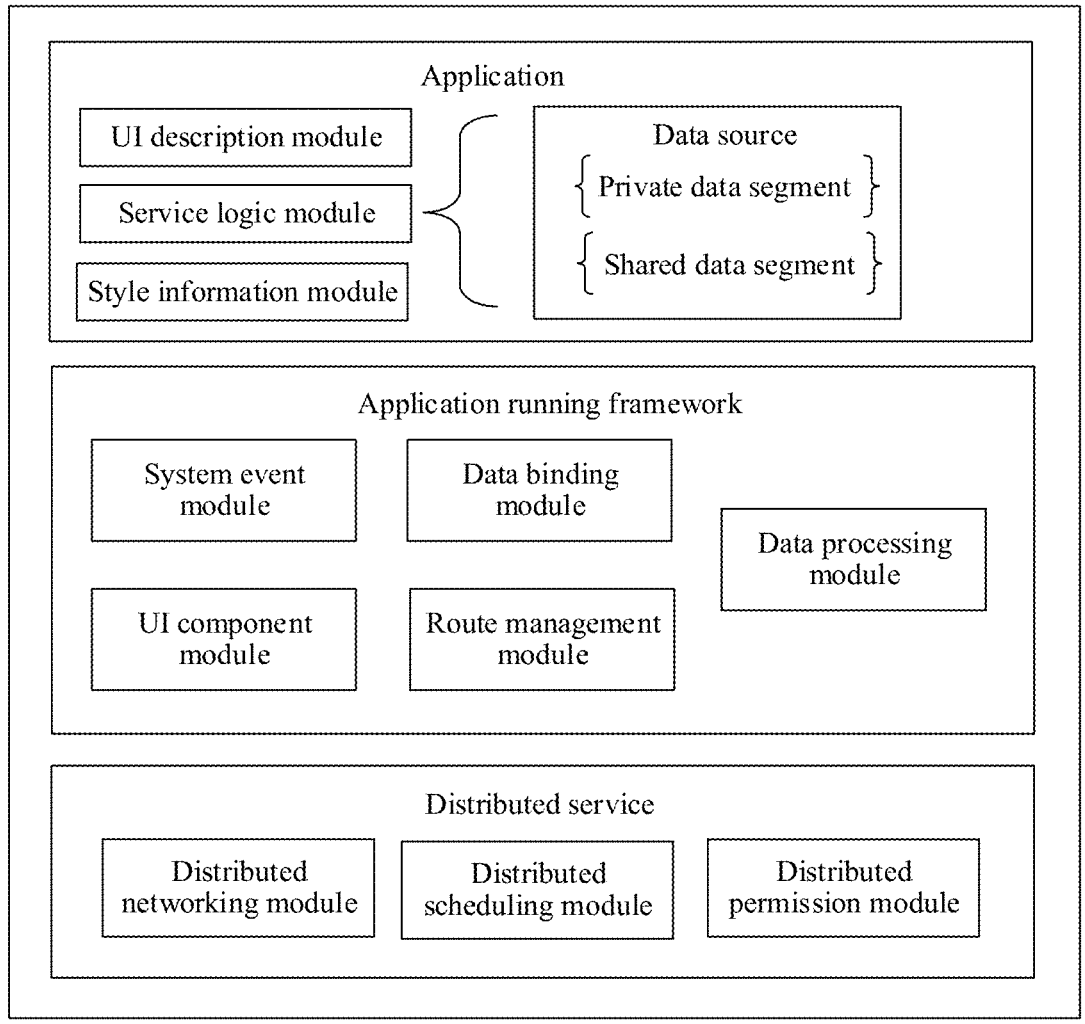
FIG. 4 is a diagram of functional modules of an electronic device according to some embodiments of the present disclosure.

FIG. 4 is a diagram of functional modules of an electronic device according to some embodiments of the present disclosure. As shown in FIG. 4, the electronic device mainly includes three subsystems: an application subsystem, an application running framework subsystem, and a distributed service subsystem. Each subsystem includes a plurality of functional modules.

The application program subsystem includes a UI description module, a service logic module, and a style information module. The UI description module is mainly configured to describe a UI of a user, and may be usually implemented by using a descriptive language, for example, xml or json. The style information module is mainly configured to describe a style of a UI component. The service logic module is mainly configured to implement a service process of the user, and may include a data source. The data source is data during service running and may be updated in real time. The data source may be divided into a private data segment and a shared data segment. The shared data segment may be used for UI state migration, and data in the shared data segment is data that needs to be migrated, for example, external data required by a current running state of the UI. Alternatively, the data in the shared data segment may be a value of a switch component. Data in the private data segment is usually data that does not expected to be migrated, and has a high privacy level, for example, device-related information. In addition, the service logic module may further include a logic running unit, for example, code or a script.

The application running framework subsystem includes a system event module, a UI component module, a data binding module, a data processing module, and a route management module. The system event module is mainly configured to deal with a system input (for example, a touch or keyboard input) and another system event, and may trigger status update and data update of a component. In addition, the system event module is further configured to listen to whether there is a migration event, and notify the data processing module. The UI component module is mainly configured to convert UI description of an application into a UI component of an entity, and is responsible for rendering, rebuilding, and refreshing the component. The data binding module is mainly configured to bind a data source and a component of an application, listen to data, and trigger rebuilding and refreshing of the component when data changes. The data processing module is mainly configured to compress and encrypt real-time data of an application, communicate with the distributed service subsystem, and migrate data. The route management module is mainly configured to record a page routing stack of a current application, and the page routing stack may be serialized and compressed by using the data processing module.

The distributed service subsystem includes a distributed networking module, a distributed scheduling module, and a distributed permission module. The distributed networking module is mainly responsible for discovering and networking a distributed device. The distributed scheduling module is mainly responsible for collecting and querying a device capability, initiating migration, and managing a status. The distributed permission module is mainly configured to be responsible for permission check of devices in a distributed network, to ensure trustworthiness of the electronic device.

Based on the foregoing embodiments, the following describes an application interface migration method in embodiments of the present disclosure.

Figure 5:
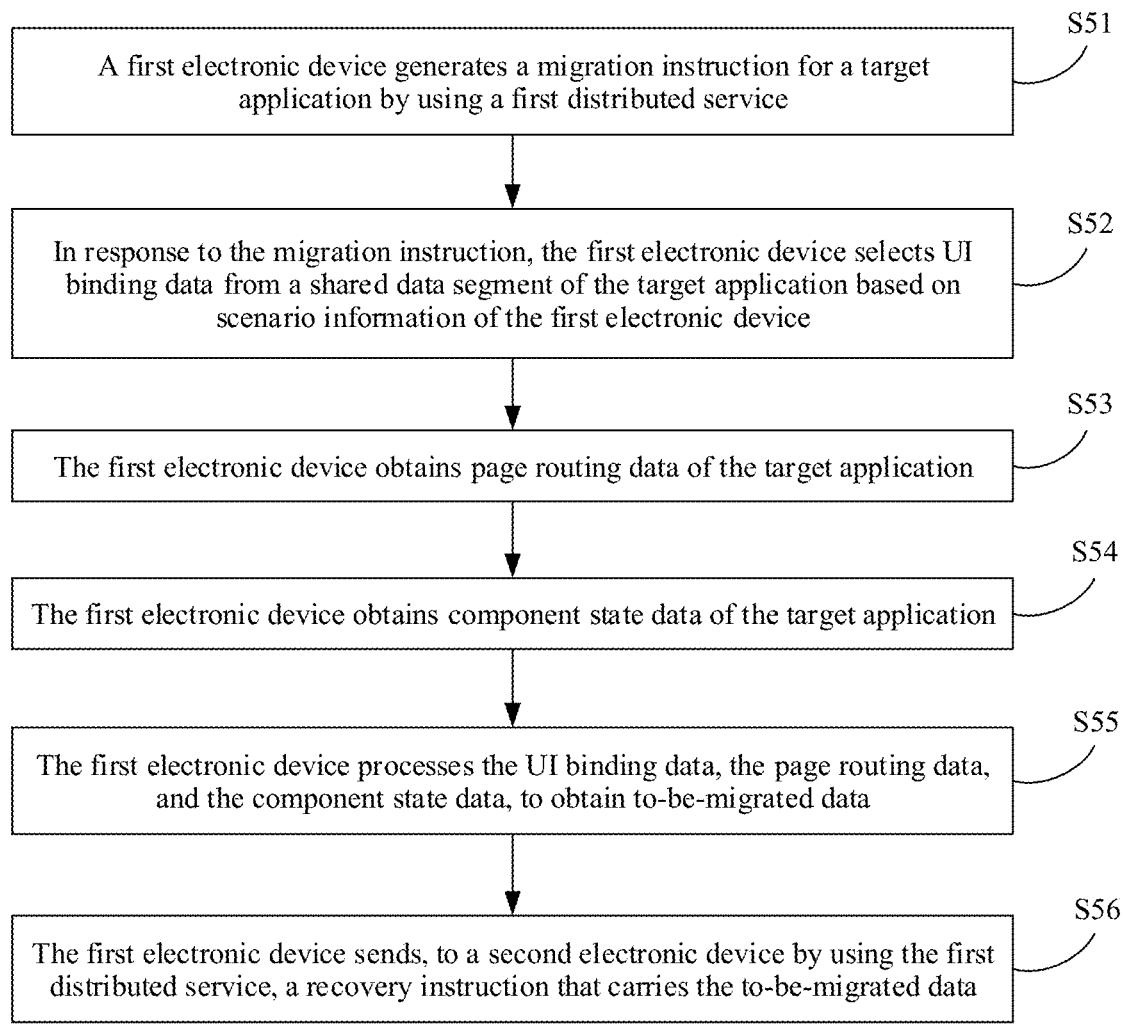
FIG. 5 is a flowchart of an application interface migration method according to some embodiments of the present disclosure.

FIG. 5 is a flowchart of an application interface migration method according to some embodiments of the present disclosure. The application interface migration method shown in FIG. 5 is applied to a first electronic device, and the method includes the following operations.

S51: The first electronic device generates a migration instruction for a target application by using a first distributed service.

The migration instruction is used to indicate to migrate a user interface UI state of the target application to a second electronic device.

In some embodiments, in which the first electronic device generates the migration instruction for the target application by using the first distributed service includes:

selecting, from surrounding devices of the first electronic device by using the first distributed service, a plurality of candidate devices on which UI state migration can be performed;

receiving a selection instruction entered for the plurality of candidate devices, and determining the second electronic device from the plurality of candidate devices according to the selection instruction;

determining whether a target application currently displayed in the first electronic device has permission for the UI state migration; and if the target application currently displayed in the first electronic device has the permission for the UI state migration, generating the migration instruction based on the target application and the second electronic device.

In this embodiment of this application, a distributed networking module may perform networking on the surrounding devices (usually devices close to the first electronic device) based on information of the surrounding network devices (for example, a screen or a memory) and information of a distributed permission module, to construct a distributed network including a plurality of electronic devices. Further, a distributed scheduling module may select, based on a capability (such as a screen size, a memory size, or a CPU capability) of the electronic devices in the distributed network, the plurality of candidate devices that can be migrated from the surrounding devices of the first electronic device for a user to select. When the user needs to migrate the target application, the user may trigger a button or icon to generate the selection instruction entered for the plurality of candidate devices. When receiving the selection instruction entered for the plurality of candidate devices, the first electronic device may determine, from the plurality of candidate devices according to the selection instruction, that a selected candidate device is the second electronic device, that is, a device that can be migrated. When the migration is initiated, the distributed scheduling module needs to notify a system event module of the current target application to process a current migration event.

During development of the target application, some permission settings are performed on the target application in a corresponding callback event, for example, allowing UI state migration, allowing UI state migration performed by a member user, and allowing video migration. Therefore, when the user determines to initiate the migration, the target application may not be migrated. The system event module needs to determine, with reference to some permission settings of the target application, whether the UI state migration is currently allowed. If the UI state migration is allowed, generation of the migration instruction is triggered, to indicate to migrate the UI state of the target application from the first electronic device to the second electronic device.

S52: In response to the migration instruction, the first electronic device selects UI binding data from a shared data segment of the target application based on scenario information of the first electronic device.

Data in the shared data segment is used to implement the UI state migration, and the UI binding data is bound to a component of the target application. Specifically, a data processing module mainly collects the data in the shared data segment from a data source of the target application by using a data binding module, and does not collect data in a private data segment.

For the data in the shared data segment, scenario information applicable to the data in the shared data segment may be predefined. The scenario information may include but is not limited to: a device type, a screen form, and any configuration information. A method for defining scenarios applicable to the data is described as follows:

```
export {
    data : {
        mydata1: "xxxxx",
        mydata2: "xxxxx" // Private data
        }
    sharedData: { // Shared Data
        mydata3: "xxxxxx", // Common data
        [@device-type=TV] mydata4: "xxxxxx", // Data
        applicable only to a TV device
        [@screen-width<500px] mydata5: "xxxxx", // Applicable
        only to a device whose screen width is less than 500px
        [@screen-shape=round] mydata6: "xxxxx" // Applicable
        only to a round screen
        }
}
```

In this embodiment of this application, when the data in the shared data segment is collected, valid UI binding data may be selected from the shared data segment of the target application based on the scenario information of the first electronic device for processing, so that an amount of following transmitted data can be reduced, and efficiency of the UI state migration can be improved.

Step S52 relates to a data binding mechanism, and the data binding mechanism may be implemented as follows: The data binding module performs data monitoring on the UI binding data in the shared data segment, and records the UI component bound to the UI binding data and a dependency relationship between the UI component and the UI binding data. When a piece of the UI binding data changes, the data binding module notifies a UI component corresponding to the piece of the UI binding data, and the UI component uses latest UI binding data to update a display effect of the UI component. Based on the data binding mechanism, when the UI binding data of the first electronic device is migrated to the second electronic device, content of a shared data segment of an application in the second electronic device is updated, so that automatic update of a UI component view can be implemented.

S53: The first electronic device obtains page routing data of the target application.

The page routing data is used to record uniform resource identifier (URI) information of a page of the target application, that is, address information of the page. Then, a related page of the target application may be recovered based on the page routing data.

S54: The first electronic device obtains component state data of the target application.

The component state data includes identification data of the component and private state data of the component. The private state data is usually data used to describe an internal state of the component, for example, a focus state and a scrolling position state of the component. The identification data is used to uniquely identify a component.

Specifically, a UI component module may traverse a UI component tree of the current target application, and collect the private state data of the component and the identification data of the component. The data processing module may obtain the component state data from the UI component module.

Private states of some components are not directly bound to the data, for example, a focus state of the component and a sliding position state of a list. For such components, whether private state data of the components is migrated may be determined by setting a migratable attribute and a component identifier id. For example, if the migratable attribute is set to true, private state data of a component identified by id can be migrated. If the migratable attribute is set to false, private state data of a component identified by id cannot be migrated. The UI component module may determine, based on the migratable attribute of the UI component, whether the private state data of the UI component is migrated.

When the migration is initiated, all components with the migratable attribute set can be searched for, to collect internal states (that is, private states) of components whose migratable attribute is true, and the internal states are serialized into structured data, to generate the component state data.

S55: The first electronic device processes the UI binding data, the page routing data, and the component state data, to obtain to-be-migrated data.

The processing performed on the UI binding data, the page routing data, and the component state data includes but is not limited to processing procedures such as serialization, compression, and encryption.

S56: The first electronic device sends, to the second electronic device by using the first distributed service, a recovery instruction that carries the to-be-migrated data.

The first electronic device may communicate with a distributed scheduling module of the second electronic device by using the distributed scheduling module, start a same target application on the second electronic device, and send the to-be-migrated data to the second electronic device.

In the method procedure described in FIG. 5, the first electronic device may perform the networking by using the distributed service, search for the device that can be migrated, and initiate a migration procedure, without strongly depending on a service center. A migration mechanism is more flexible, and based on point-to-point transmission, efficiency of following page migration can be improved. In addition, valid UI binding data may be further selected based on scenario information of the first electronic device, so that an amount of transmitted data can be reduced. In an entire process, complete UI component information does not need to be serialized, so that a migration speed is faster.

Figure 6:
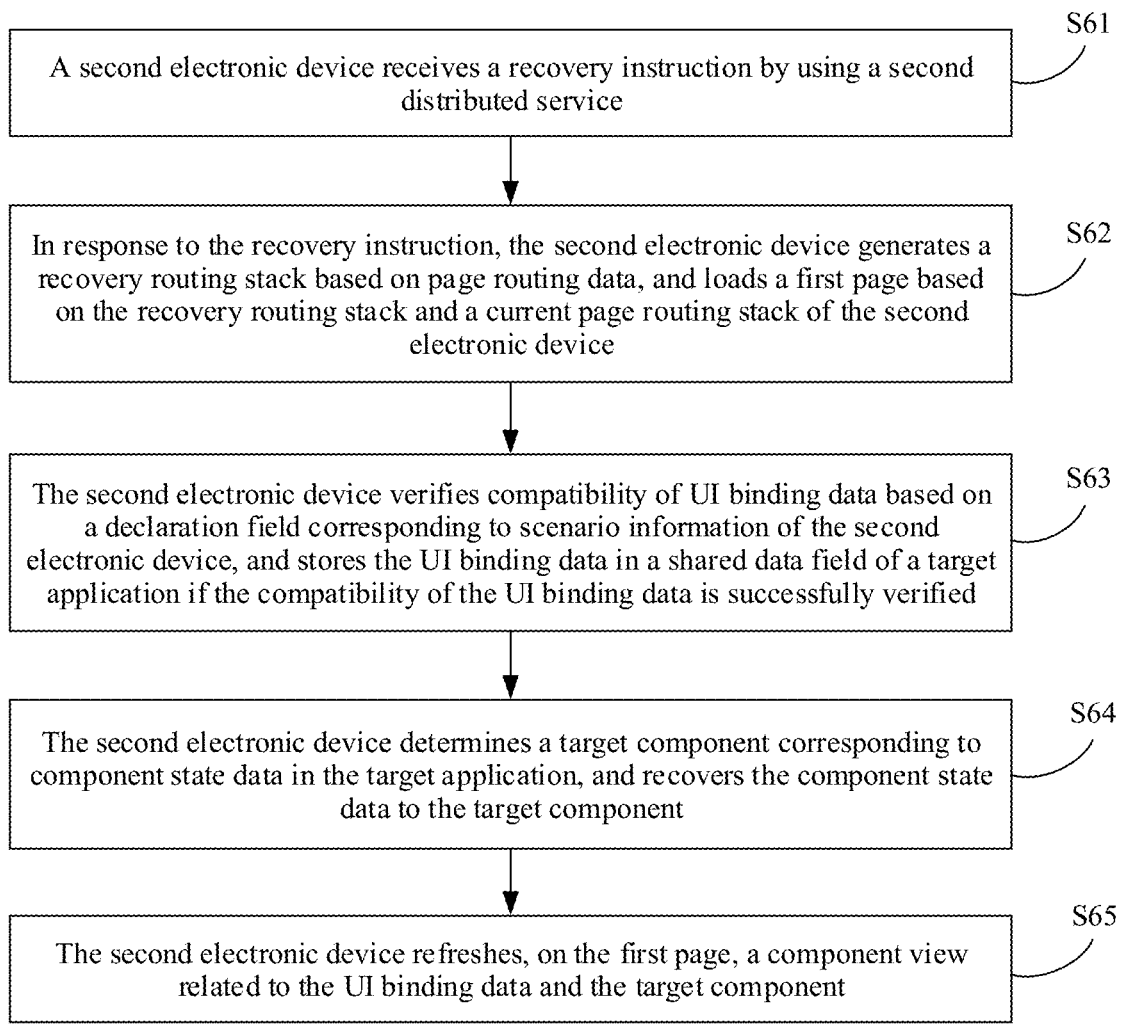
FIG. 6 is a flowchart of another application interface migration method according to some embodiments of the present disclosure.

FIG. 6 is a flowchart of another application interface migration method according to some embodiments of the present disclosure. The application interface migration method shown in FIG. 6 is applied to a second electronic device, and the method includes the following operations.

S61: The second electronic device receives a recovery instruction by using a second distributed service.

The recovery instruction is used to indicate to recover a UI state of a target application on the second electronic device, the recovery instruction carries to-be-migrated data, the to-be-migrated data includes page routing data, UI binding data, and component state data. The UI binding data is bound to a component of the target application, and the component state data is private state data of the component, for example, a focus state and a scrolling position state of the component.

In this embodiment of this application, the second electronic device may receive, by using an internal distributed scheduling module, the recovery instruction that carries the to-be-migrated data and that is sent by a first electronic device, and the second electronic device may indicate, by using the internal distributed scheduling module, a data processing module of the target application to perform recovery processing on the to-be-migrated data, to obtain the page routing data, the UI binding data, and the component state data included in the to-be-migrated data. The recovery processing may include but is not limited to processing procedures such as deserialization, decompression, and decryption.

In this embodiment of this application, if the second electronic device does not open the target application currently, the second electronic device may open the target application on the second electronic device by using the distributed service. Alternatively, if the second electronic device does not download the target application currently, the second electronic device may be triggered, by using the distributed service, to download the target application and open the target application.

S62: In response to the recovery instruction, the second electronic device generates a recovery routing stack based on the page routing data, and loads a first page based on the recovery routing stack and a current page routing stack of the second electronic device.

Specifically, the loading a first page based on the recovery routing stack and a current page routing stack of the second electronic device includes:

obtaining first routing data at the top of the recovery routing stack, and moving the first routing data to the top of the current page routing stack of the second electronic device; and loading the first page based on the first routing data of the current page routing stack.

In this embodiment of this application, page routing information may be maintained by using a stack. Information of a currently jumped-to page may be recorded in the stack, and usually includes an identifier (for example, a name) of the page and uniform resource identifier (URI) information of the page. A route management module may serialize routing data of a complete page routing stack into formatted data, and the formatted data is, for example, character string data or binary data. After obtaining the page routing data (that is, the serialized formatted data), the second electronic device may generate the recovery routing stack based on the page routing data.

Figure 7A:
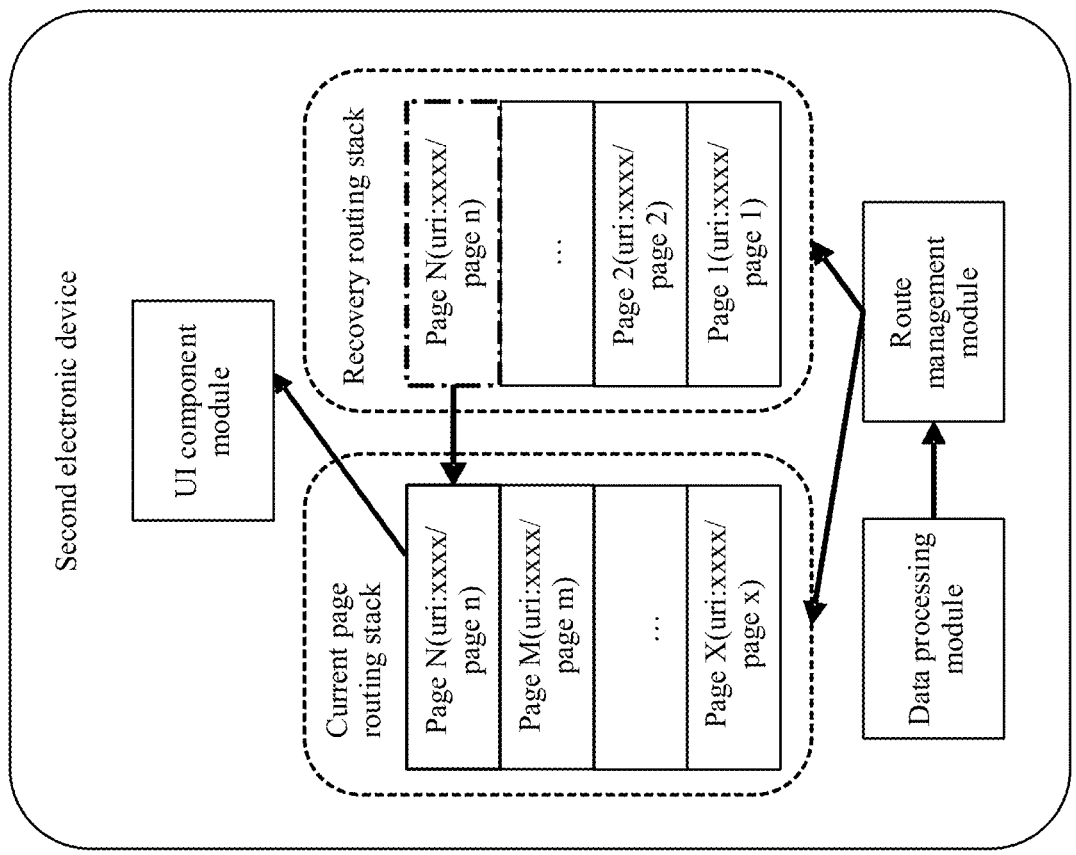
FIG. 7A is a schematic diagram of page routing stack migration according to some embodiments of the present disclosure.
Figure 7A:
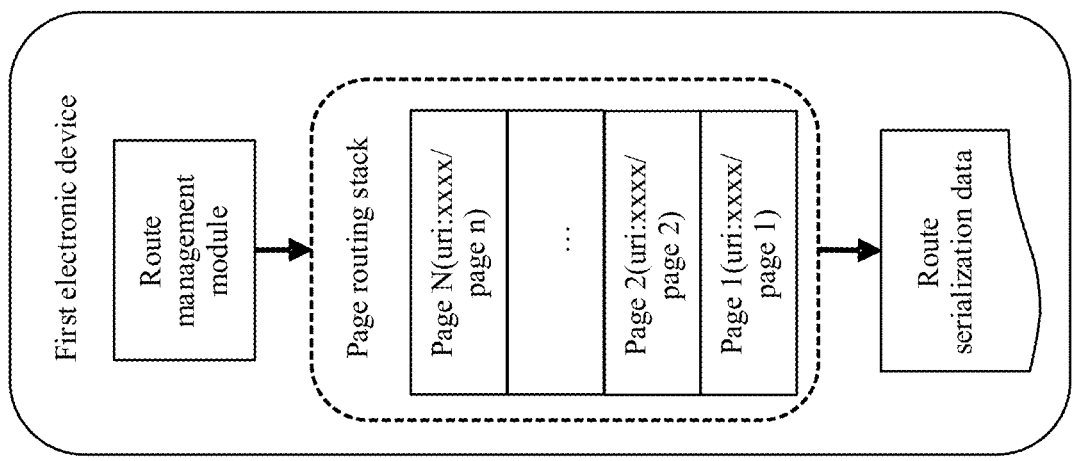

FIG. 7A is a schematic diagram of page routing stack migration according to some embodiments of the present disclosure. In FIG. 7A, page routing information of the first electronic device before migration is maintained by a page routing stack. Pages in the page routing stack of the first electronic device have been loaded on the first electronic device, and underwent processes such as page loading parsing, layout rendering, and composition. When the first electronic device initiates migration, data on the page routing stack is serialized and sent to the data processing module of the second electronic device, and the data processing module sends the data to the route management module. There are two routing stacks on the second electronic device: the current page routing stack and the recovery routing stack. Page routing information on the recovery routing stack is consistent with the page routing information on the first electronic device, and includes page names of all pages from Page 1 to Page N and URI information corresponding to each page, that is, uri:xxx/page 1, . . . , and uri:xxx/page n. It should be noted that the page information in the recovery routing stack is only pure page information, and has not been loaded. By comparison, the current page routing stack is information of pages that have been currently loaded by the second electronic device, and the pages on the current page routing stack have undergone processes such as page loading parsing, layout rendering, and composition on the second electronic device. Each page in the current page routing stack has been associated with an entity data structure and some cached data of a component on the page. When a page pops up in the current page routing stack, a next page in the current page routing stack may be quickly displayed.

In this embodiment of this application, the second electronic device may remove the first routing data at the top of the stack from the recovery routing stack, and store the first routing data at the top of the current page routing stack of the second electronic device. As shown in FIG. 7A, Page N(uri:xxxx/page n) in the recovery routing stack is removed and stored at the top of the current page routing stack, and Page M(uri:xxxx/page m) at the top of an original stack in the current page routing stack is pushed to a next layer. Further, a corresponding page (that is, the first page) may be loaded by using Page N(uri:xxxx/page n) on the current page routing stack, and component content of the first page is rendered and displayed by using a UI component module.

In some embodiments, the application interface migration method further includes:
  receiving a back instruction for the first page;
  in response to the back instruction, determining whether the recovery routing stack is empty;
  if the recovery routing stack is not empty, obtaining second routing data at the top of the recovery routing stack, and moving the second routing data to the top of the current page routing stack of the second electronic device; and
  loading a second page based on the second routing data of the current page routing stack.

In some embodiments, after the second electronic device loads the first page, if a user expects to return to the current first page, the user may tap a button on the page and trigger generation of the back instruction for the first page. The second electronic device pops up the current first page from the current page routing stack, and determines whether the recovery routing stack is empty. If the recovery routing stack is not empty, it indicates that a page related to the first page still exists in the recovery routing stack, and the second electronic device may repeat the previous operation to obtain the second routing data at the top of the recovery routing stack, move the second routing data to the top of the stack of the current page routing stack of the second electronic device, and load the second page based on the second routing data of the current page routing stack. By analogy, if a back instruction triggered by the user for the second page is subsequently received, the second electronic device performs processing based on the foregoing procedure. In this manner, all pages loaded on the first electronic device may be seamlessly connected to the second electronic device, and the user obtains same experience by performing an operation on the second electronic device and performing an operation on the first electronic device, and does not feel a difference, to improve user experience.

In some embodiments, the application interface migration method further includes:
  if the recovery routing stack is empty, obtaining third routing data at the top of the current page routing stack; and
  loading a third page based on the third routing data of the current page routing stack.

In some embodiments, the recovery routing stack may be empty. If the recovery routing stack is empty, the second electronic device obtains the third routing data at the top of the current page routing stack, and loads the third page directly based on the third routing data of the current page routing stack. The third routing data is data at the top of the stack of the current page routing stack of the second electronic device before the migration, and the third page is also a page displayed on the second electronic device before the migration.

Figures 1, 7B:
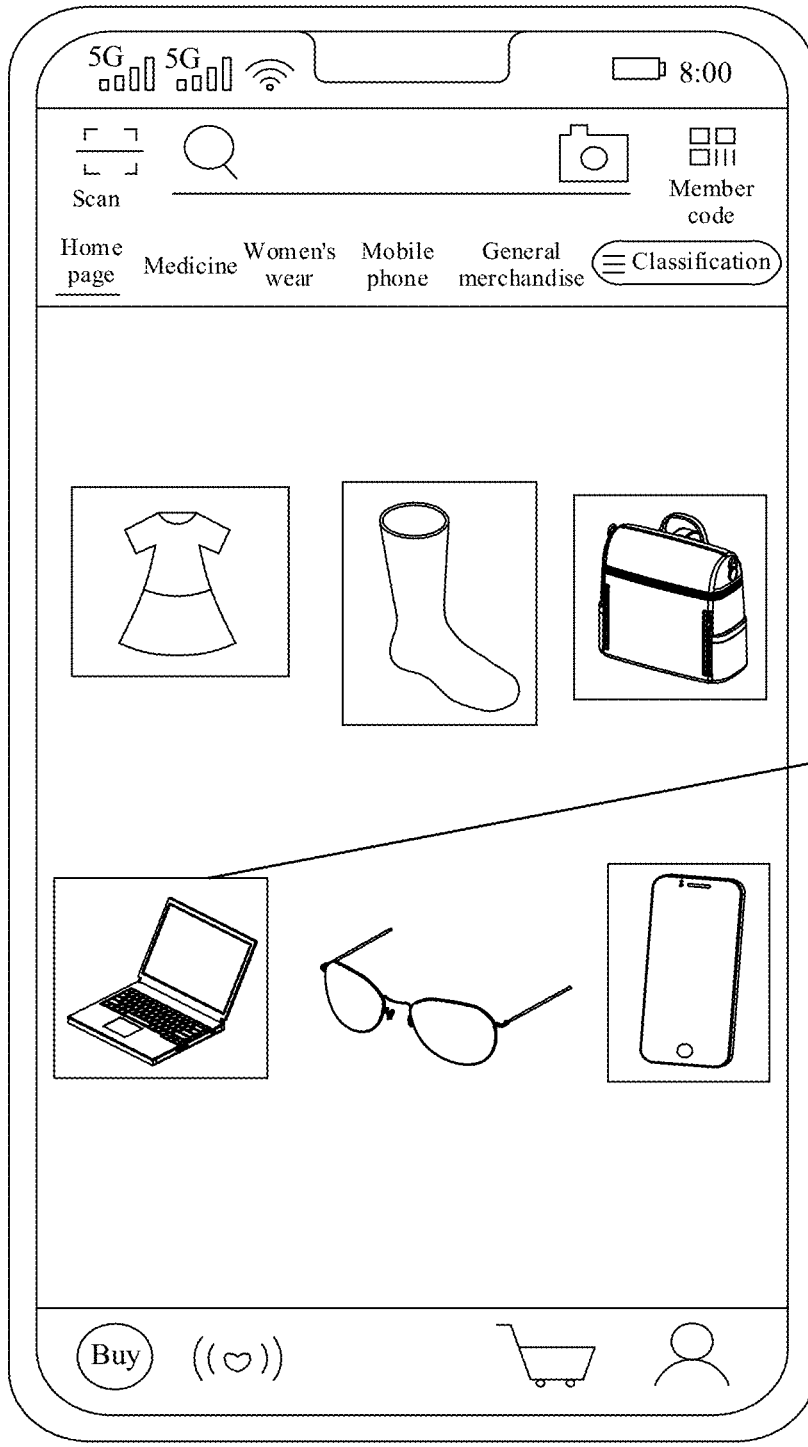
Figures 2, 7B:
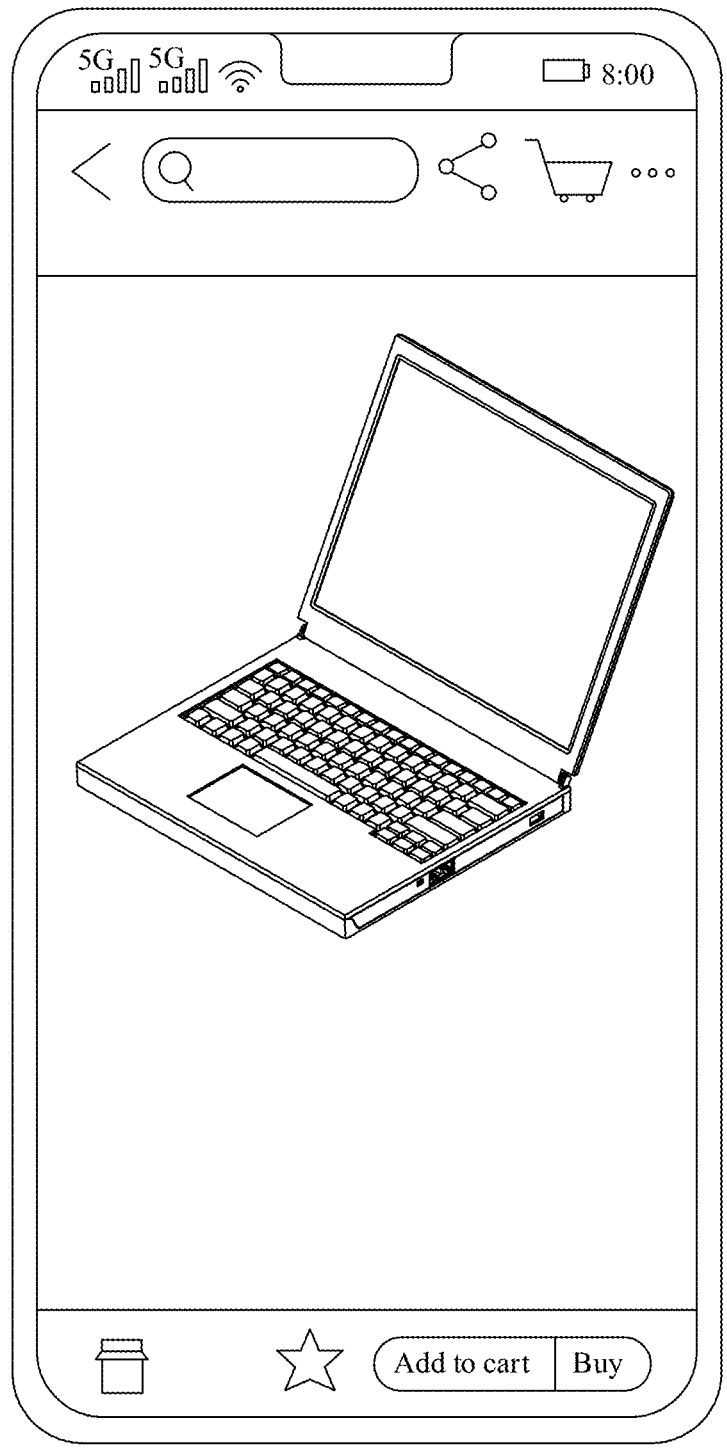
Figures 3, 7B:
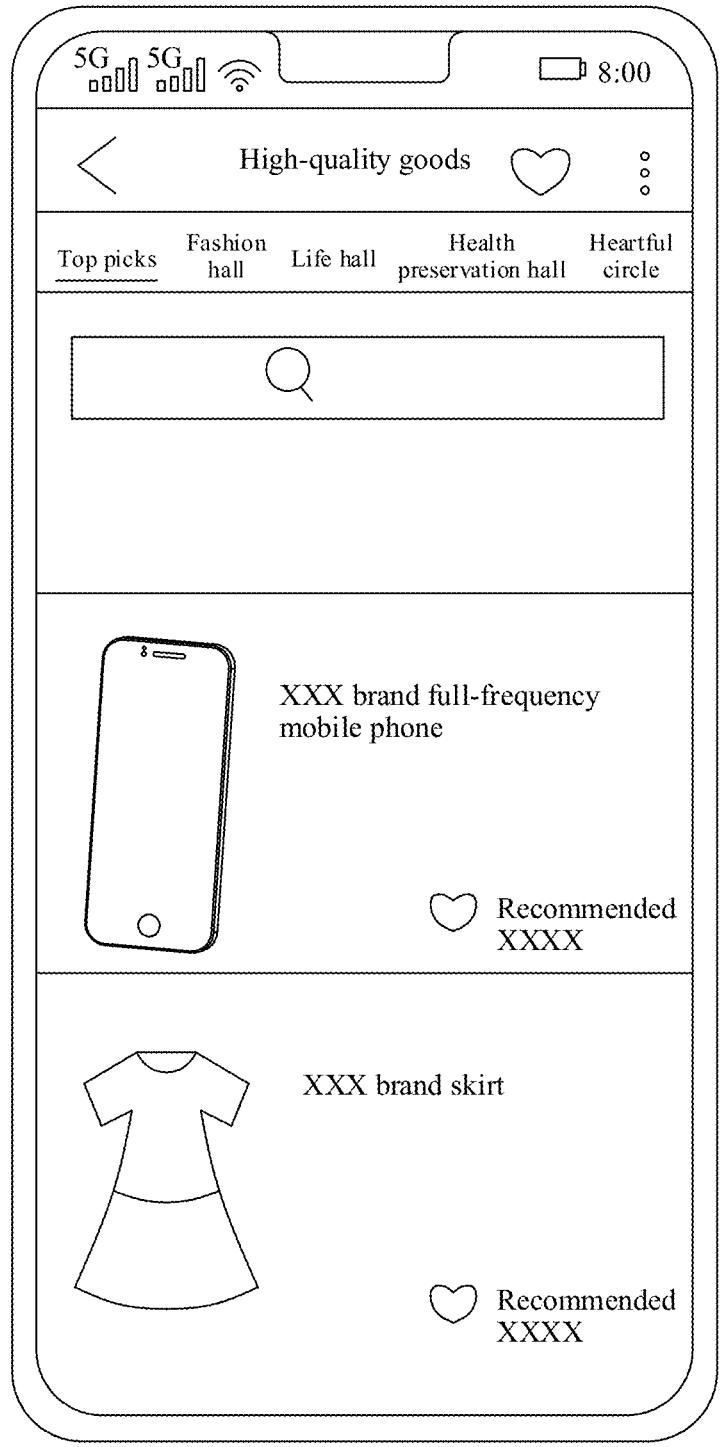
Figures 4, 7B:
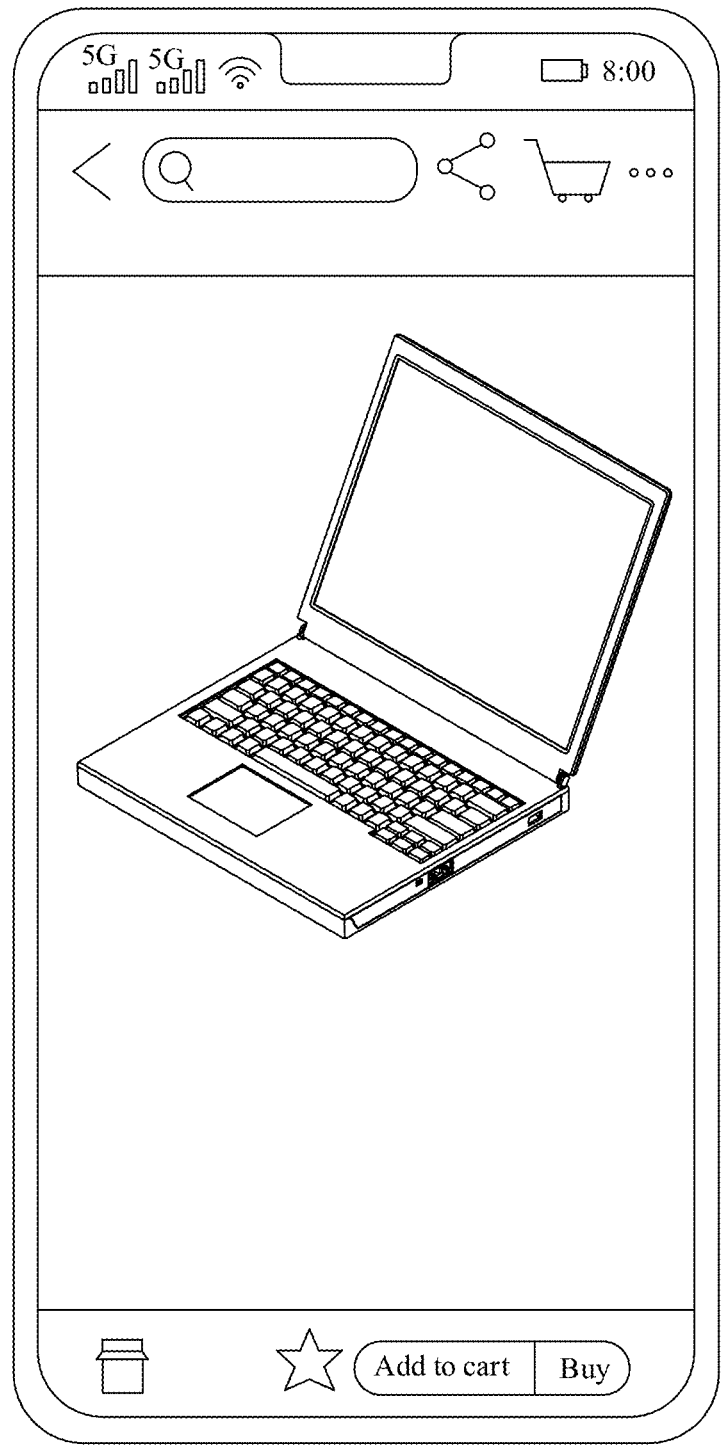

FIG. 7B-1 to FIG. 7B-4 are a schematic diagram of an interface of page migration according to some embodiments of the present disclosure. In FIG. 7B-1 to FIG. 7B-4, a user taps a small icon of a notebook computer on a page 1 on a first electronic device, and the page jumps to a sales page of the notebook computer on a page 2. The user triggers migration on the page 2, and expects to migrate the page 2 on the first electronic device to a second electronic device. However, currently, the second electronic device is on a page 3, and the page 3 of the second electronic device is different from the page 2 of the first electronic device. After the foregoing page route migration mechanism in this application is executed, the page on the second electronic device is switched from the page 3 to the page 2, to implement a visual effect of completely migrating the page 2 of the first electronic device to the second electronic device.

Figures 1, 7C:
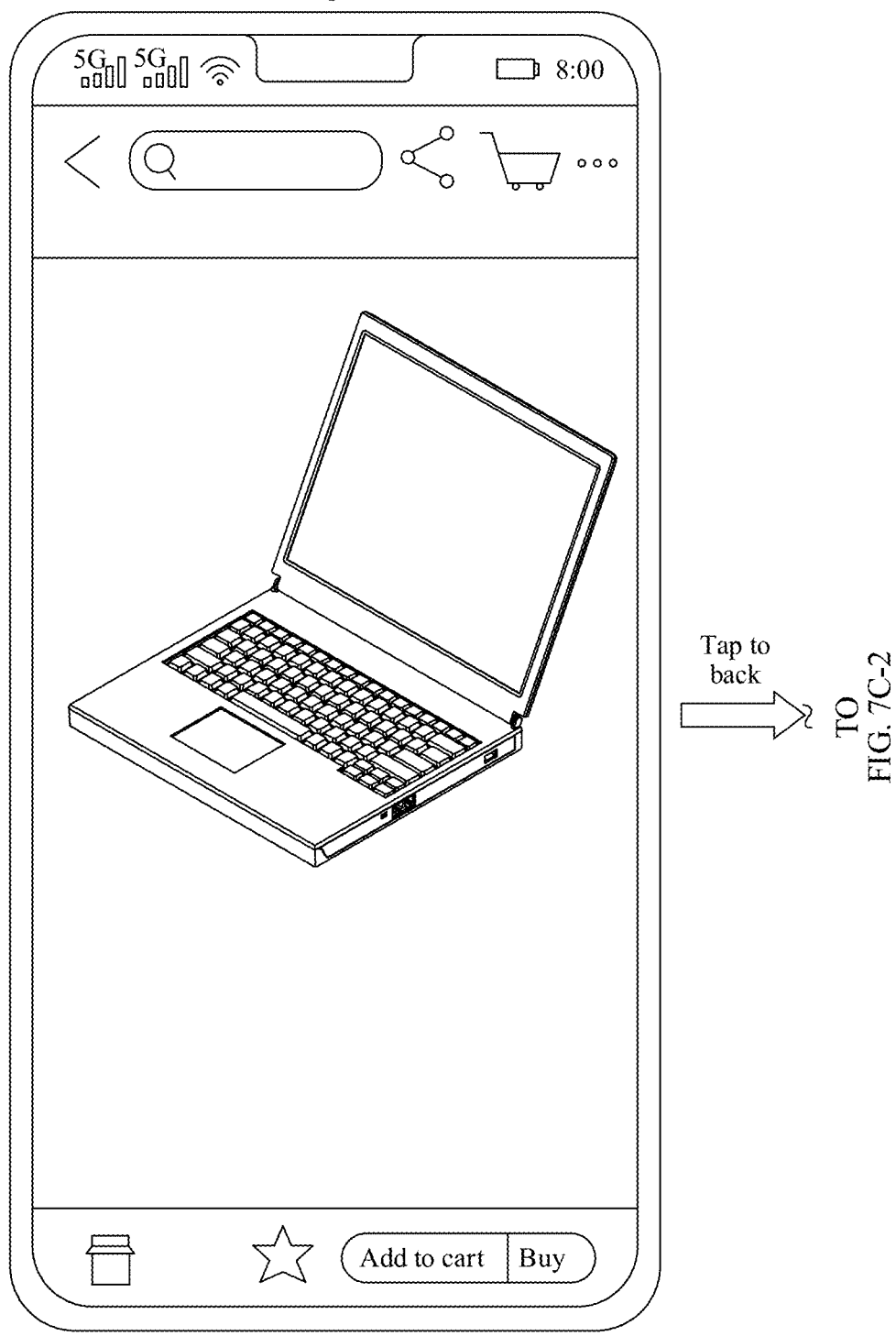
Figures 2, 7C:
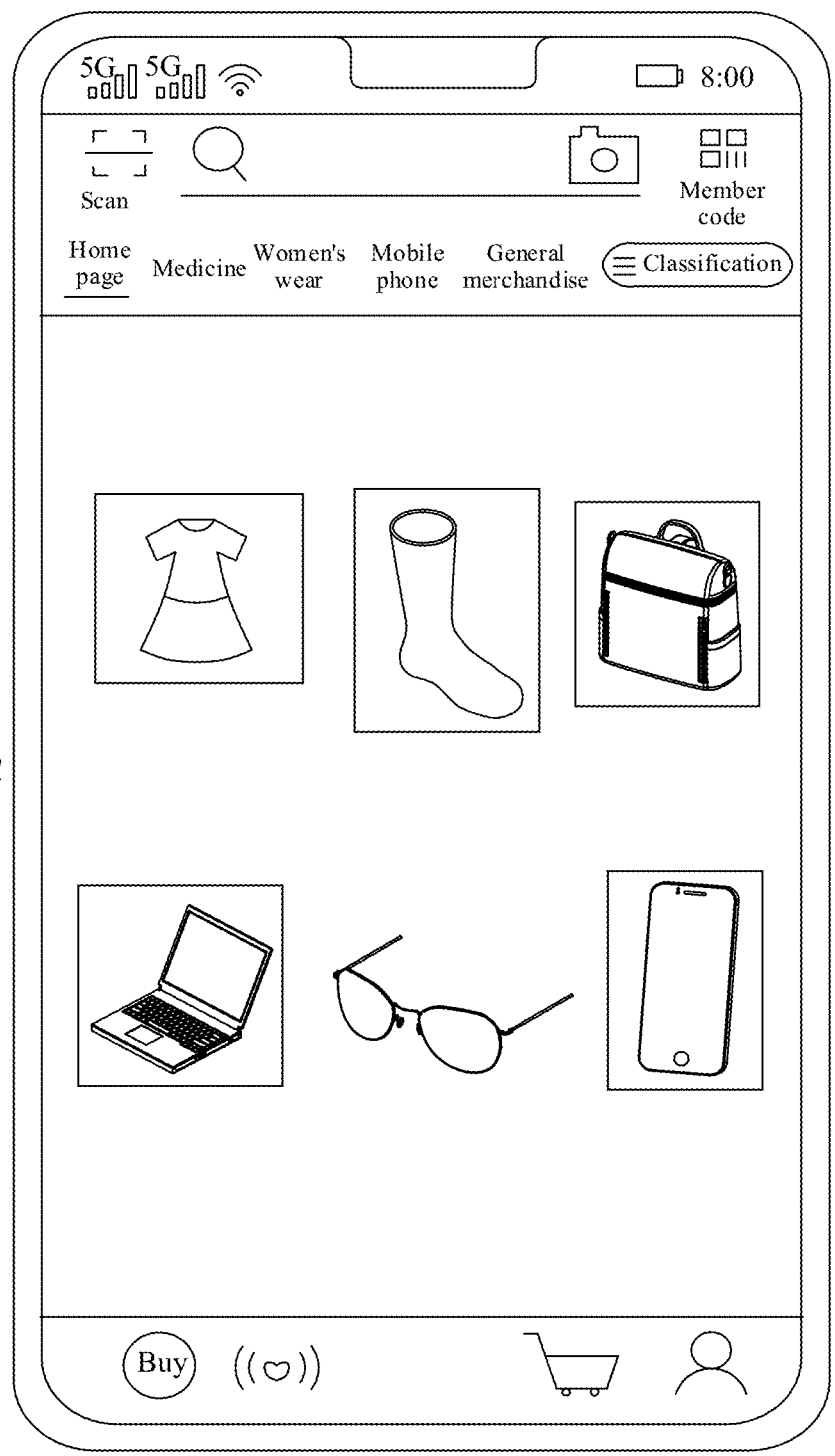
Figures 3, 7C:
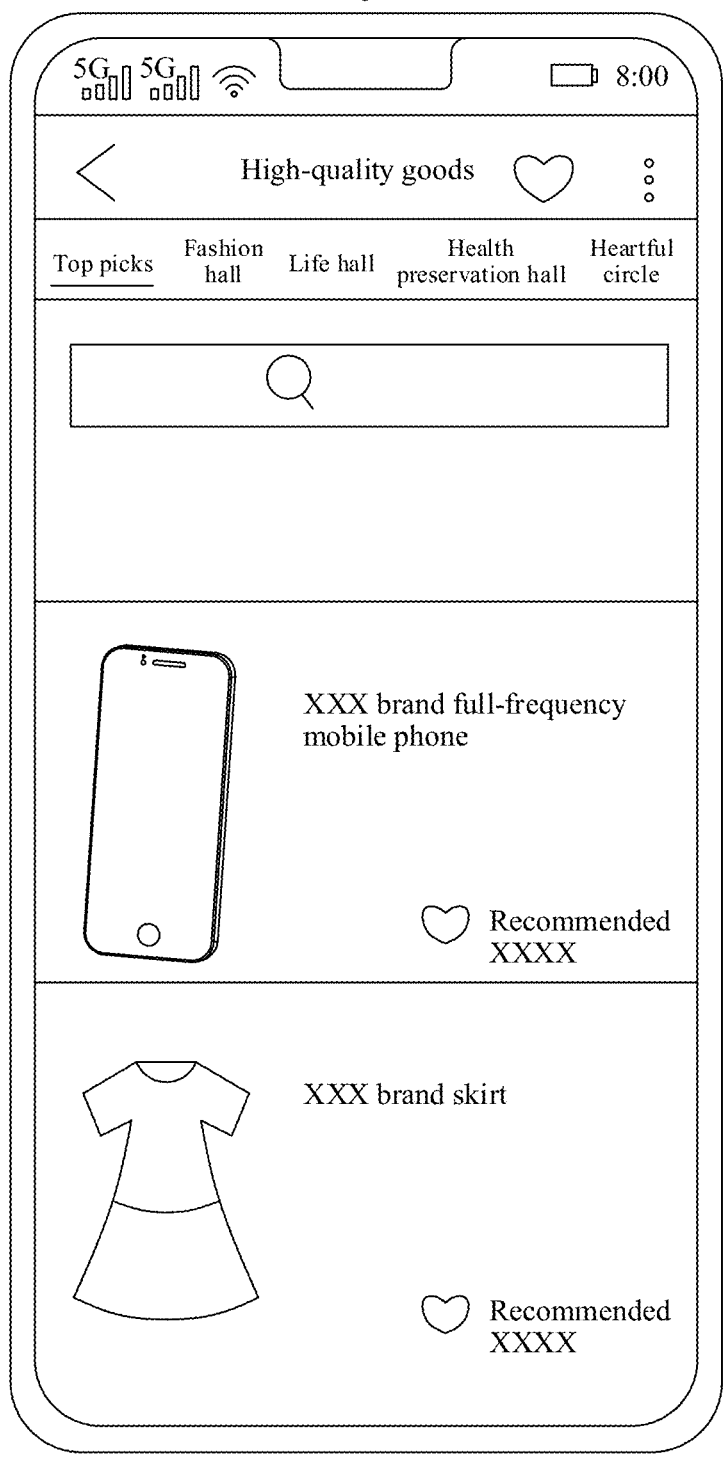

As shown in FIG. 7C-1 to FIG. 7C-3, when the user taps a button on the page 2 of the second electronic device to trigger a back instruction for the page 2, the second electronic device executes the foregoing page route back mechanism, to return the page 2 to the page 1. If the user further taps Back, the second electronic device returns the page 1 to the page 3. In the entire process, page migration and rollback are seamlessly connected.

S63: The second electronic device checks compatibility of the UI binding data based on a declaration field corresponding to scenario information of the second electronic device, and stores the UI binding data in a shared data segment of the target application if the compatibility of the UI binding data is successfully checked.

For details of the data binding mechanism in operation S63, refer to the related descriptions in operation S52.

Specifically, the checking compatibility of the UI binding data based on a declaration field corresponding to scenario information of the second electronic device includes:
  obtaining the declaration field corresponding to the scenario information of the second electronic device;
  determining whether the UI binding data is valid data declared in the declaration field; and
  if the UI binding data is the valid data declared in the declaration field, determining that the compatibility of the UI binding data is successfully checked.

In this embodiment of this application, versions of target applications on the first electronic device and the second electronic device may be different. If the versions are different, the migration cannot be performed. Therefore, before data recovery is performed, the compatibility check needs to be performed on the data, to prevent a migration failure.

For the second electronic device, field declarations of some valid data may be defined in advance based on the scenario information of the device, and the compatibility check is performed based on the field declaration. The scenario information may include but is not limited to, a device type, a screen form, and any configuration information.

For example, it is assumed that the UI binding data migrated by the first electronic device is shown in Table 1, and the field declaration corresponding to the scenario information of the second electronic device is shown in Table 2.

TABLE 1

| Data1 | Value1 |
|-------|--------|
| Data2 | Value2 |
| ... | ... |
| DataX | ValueX |

TABLE 2

| Data1 |
|-------|
| Data2 |
| ... |
| DataX |

A field set S1 obtained according to Table 1 is (Data1, Data2, ..., DataX), a declaration field S2 obtained according to Table 2 is (Data1, Data2, ..., DataX), and compatibility check may be performed according to S1 and S2. If S1⊆S2, there is no compatibility problem, and the data may continue to be recovered. If S1⊆S2 is not satisfied, there may be a compatibility problem between the target application of the first electronic device and the target application of the second electronic device, and the data cannot continue to be recovered. The user may be prompted that the migration fails, or the distributed scheduling module is indicated to perform version upgrade on the target application. Data in S1 is a valid data set that is selected by the first electronic device based on the scenario information, and data in S2 is a valid data field declaration set that is selected by the second electronic device based on the scenario information.

In some embodiments, after the second electronic device loads the first page, the application interface migration method further includes:
checking integrity of the UI binding data;
if the integrity of the UI binding data is successfully checked, performing the operation of checking compatibility of the UI binding data based on a declaration field corresponding to scenario information of the second electronic device; and
the storing the UI binding data in a shared data segment of the target application if the compatibility of the UI binding data is successfully checked includes:
if the compatibility of the UI binding data is successfully checked, determining a UI component bound to the shared data segment of the target application;
obtaining a first data type required by the UI component;
determining whether the first data type is consistent with a second data type of the UI binding data; and
storing the UI binding data in the shared data segment of the target application if the first data type is consistent with the second data type of the UI binding data.

In some embodiments, after receiving the migrated UI binding data, the data processing module of the second electronic device first checks the integrity of the UI binding data, to ensure that the data is not tampered with. The data integrity check belongs to the conventional technology, and details are not described herein. After the integrity of the UI binding data is successfully checked, the compatibility of the UI binding data is checked. After the compatibility of the UI binding data is successfully checked, the data type of the UI binding data further needs to be checked, to ensure consistency between the data type required by the UI component and the data type of the UI binding data, and ensure that following recovery can be performed properly.

Usually, an attribute of the UI component has a type requirement on bound data. The data type is usually classified into types such as a character string, a number, an object, an array, and Boolean. The second electronic device needs to traverse and check the UI component bound to the shared data segment in the current target application, and determine the first data type required by the UI component. Further, the second electronic device compares the first data type with the second data type of the UI binding data, and determines whether the first data type and the second data type of the UI binding data are consistent. If the first data type and the second data type of the UI binding data are consistent, the data may continue to be recovered. If inconsistency exists, the data cannot continue to be recovered, and the user may be prompted that the migration fails, or the distributed scheduling module is indicated to upgrade the target application.

After the integrity, the compatibility, and the data type of the UI binding data are all successfully checked, the UI binding data may be stored in the shared data segment of the current target application, to trigger a data monitoring event of the data binding module, and further update view information of the UI component.

Optionally, when the check of integrity, the compatibility, and the data type of the UI binding data is performed, if any check fails, the second electronic device sends a notification message to the first electronic device, and the notification message is used to indicate that the migration fails.

S64: The second electronic device determines a target component corresponding to the component state data in the target application, and recovers the component state data to the target component.

In this embodiment of this application, a corresponding target component may be determined based on the component state data, and the component state data is restored to the target component, so that component state migration can be completed.

A migratable attribute and a component id may be set in advance, to help quickly recover the private state of the component.

S65: The second electronic device refreshes, on the first page, a component view related to the UI binding data and the target component.

In this embodiment of this application, after recovering the page routing data, the UI binding data, and the component state data, the second electronic device may refresh the component view on the entire first page, to complete overall migration of the UI state of the target application from the first electronic device to the second electronic device, so as to achieve an effect of seamless connection of the target application on different electronic devices.

In the method procedure described in FIG. 6, before recovering the data, the second electronic device performs the integrity check, the compatibility check, and the data type check on the data, to ensure normal recovery of the data. Page recovery is performed based on the recovery routing stack and the current page routing stack, so that seamless migration and recovery of a page between two routing stacks can be ensured, and a mechanism of associated management between a recovery route and an original route is implemented. In addition, the component state data is set, so that a requirement of differentiated display of a same application on interfaces of different devices can be satisfied. In the entire page recovery process, seamless migration of the UI state on different electronic devices is implemented.

Figure 8A:
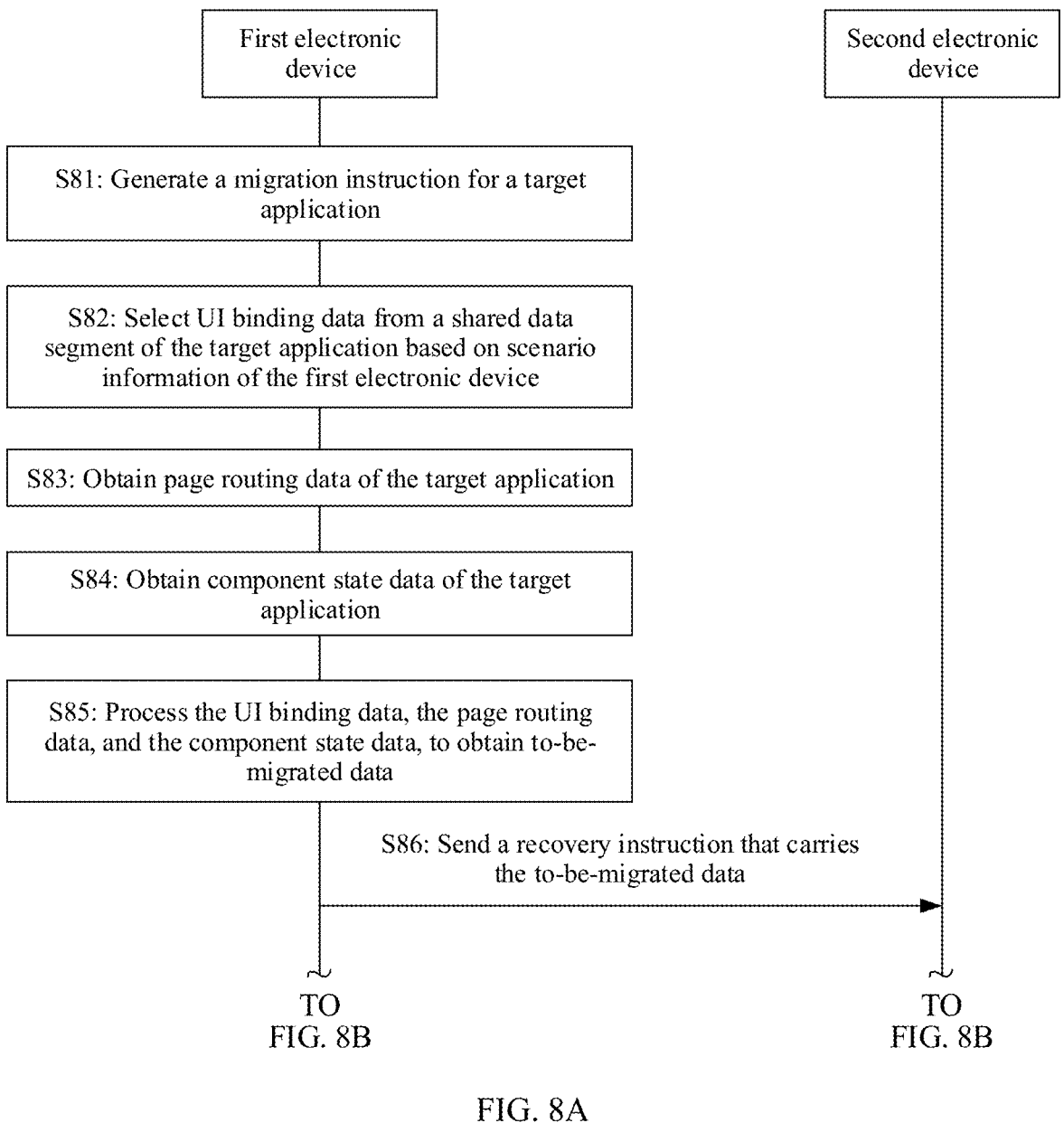
FIG. 8A and FIG. 8B are flowcharts of an application interface migration method according to some embodiments of the present disclosure.
Figure 8B:
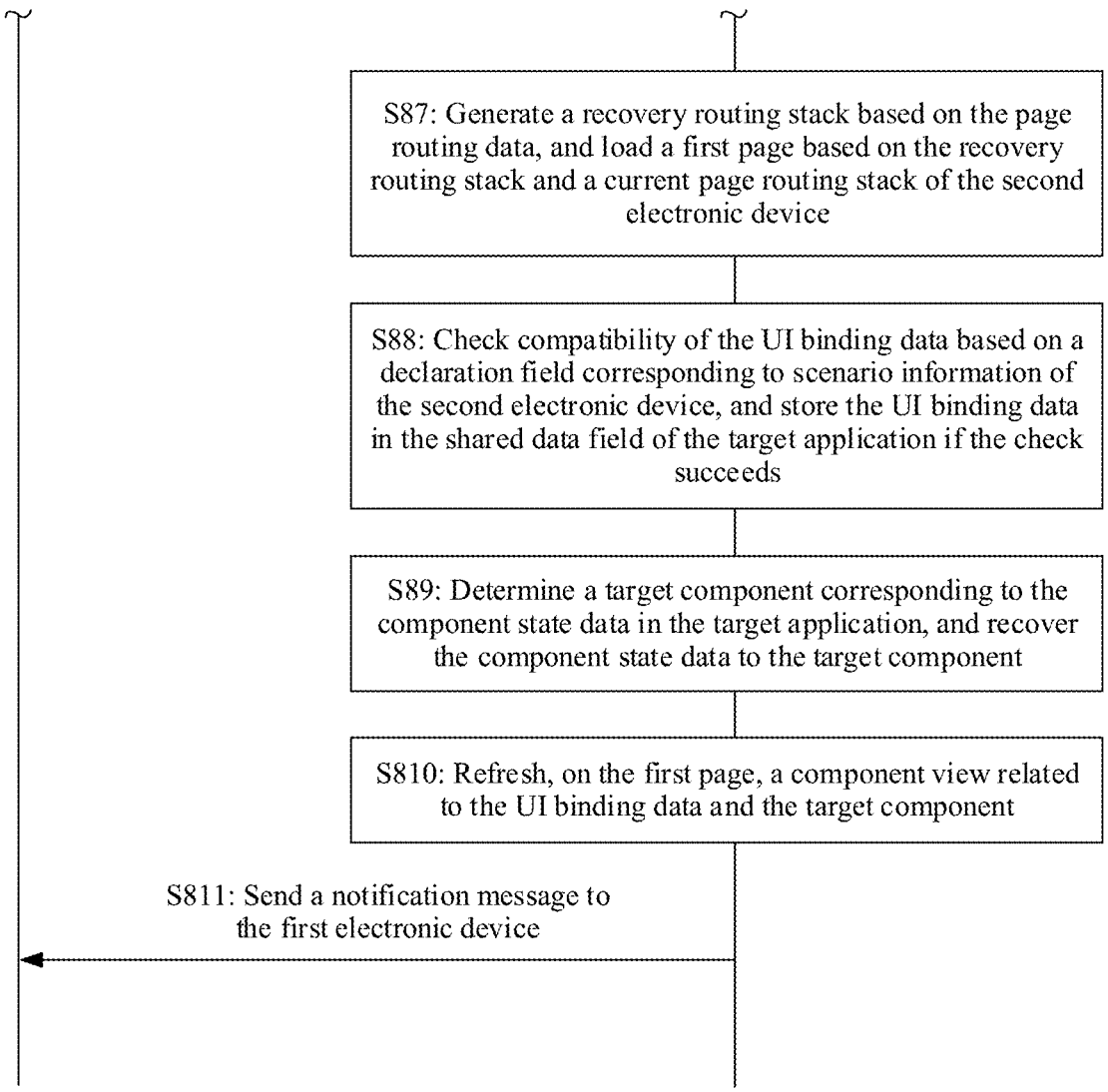

FIG. 8A and FIG. 8B are a flowchart of another application interface migration method according to some embodiments of the present disclosure. The application interface migration method shown in FIG. 8A and FIG. 8B is applied to a first electronic device and a second electronic device. For descriptions, refer to the related descriptions in corresponding method operations in FIG. 5 and FIG. 6. Details are not described herein again. The method includes the following operations.

S81: The first electronic device generates a migration instruction for a target application by using a first distributed service.

S82: In response to the migration instruction, the first electronic device selects UI binding data from a shared data segment of the target application based on scenario information of the first electronic device.

S83: The first electronic device obtains page routing data of the target application.

S84: The first electronic device obtains component state data of the target application.

S85: The first electronic device processes the UI binding data, the page routing data, and the component state data, to obtain to-be-migrated data.

S86: The first electronic device sends, by using the distributed service, a recovery instruction that carries the to-be-migrated data to the second electronic device.

S87: In response to the recovery instruction, the second electronic device generates a recovery routing stack based on the page routing data, and loads a first page based on the recovery routing stack and a current page routing stack of the second electronic device.

S88: The second electronic device checks compatibility of the UI binding data based on a declaration field corresponding to scenario information of the second electronic device, and stores the UI binding data in the shared data segment of the target application if the compatibility of the UI binding data is successfully checked.

In this embodiment of this application, operation S82 and operation S88 relate to a data binding mechanism. For details, refer to the foregoing related descriptions.

Figures 1, 9A:
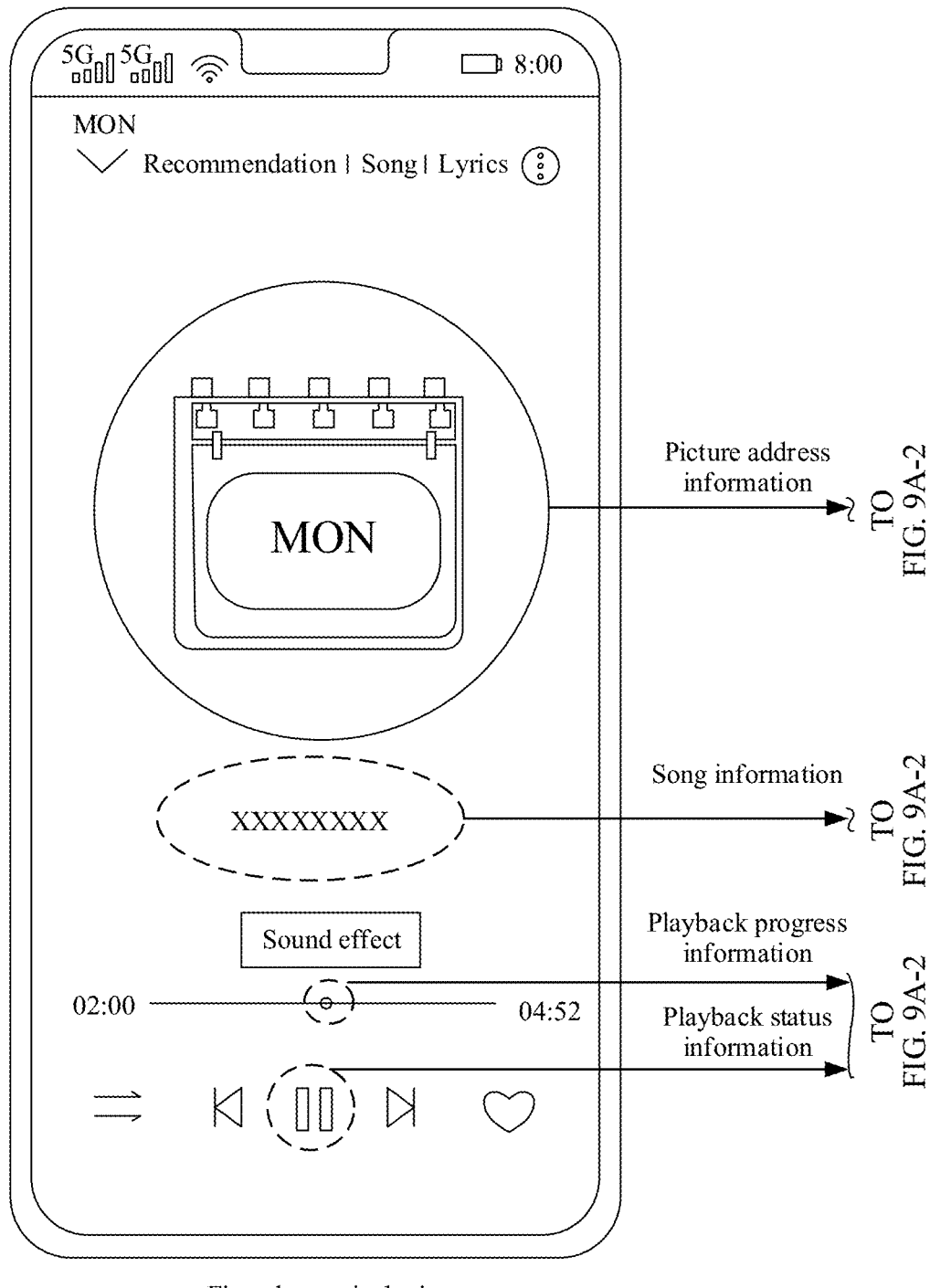
Figures 2, 9A:
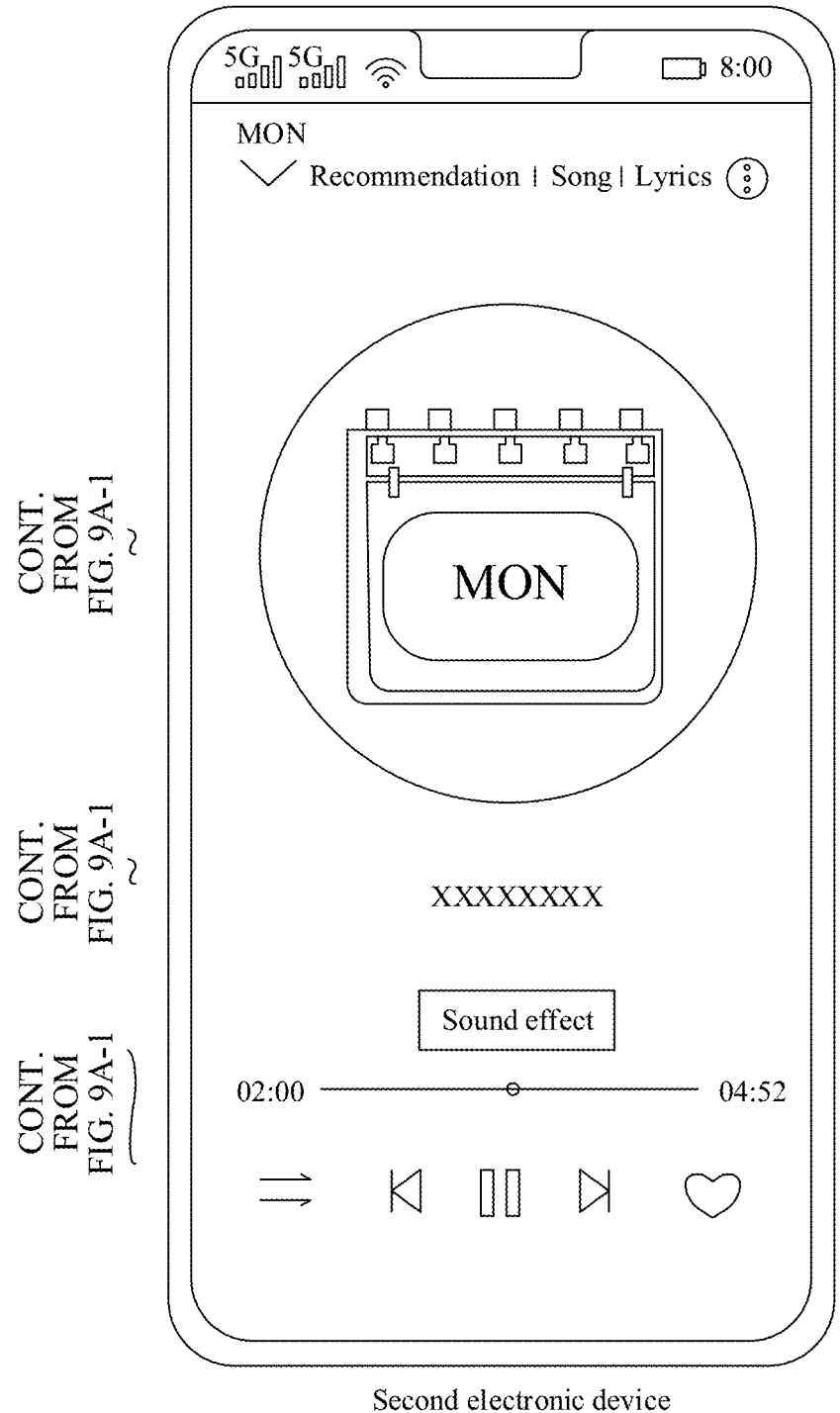

According to the foregoing data binding mechanism, pages shown in FIG. 9A-1 and FIG. 9A-2 may be implemented. FIG. 9A-1 and FIG. 9A-2 is a schematic diagram of an interface of data migration according to some embodiments of the present disclosure. As shown in FIG. 9A-1 and FIG. 9A-2, a first electronic device has a plurality of pieces of UI binding data, and each piece of UI binding data is bound to a corresponding component. For example, picture address information is bound to a corresponding picture, song information is bound to corresponding text, playback progress information is bound to a corresponding progress bar, and playback status information is bound to a corresponding play control. According to the foregoing data binding mechanism, the UI binding data bound to each component is migrated from the first electronic device to a second electronic device, so that migration of a complete application scenario can be implemented.

S89: The second electronic device determines a target component corresponding to the component state data in the target application, and recovers the component state data to the target component.

In this embodiment of this application, a migratable attribute and a component id may be set in advance, to help quickly recover the private state of the component, and further help accurately recover a state of a component in some differentiated electronic devices.

Figure 9B:
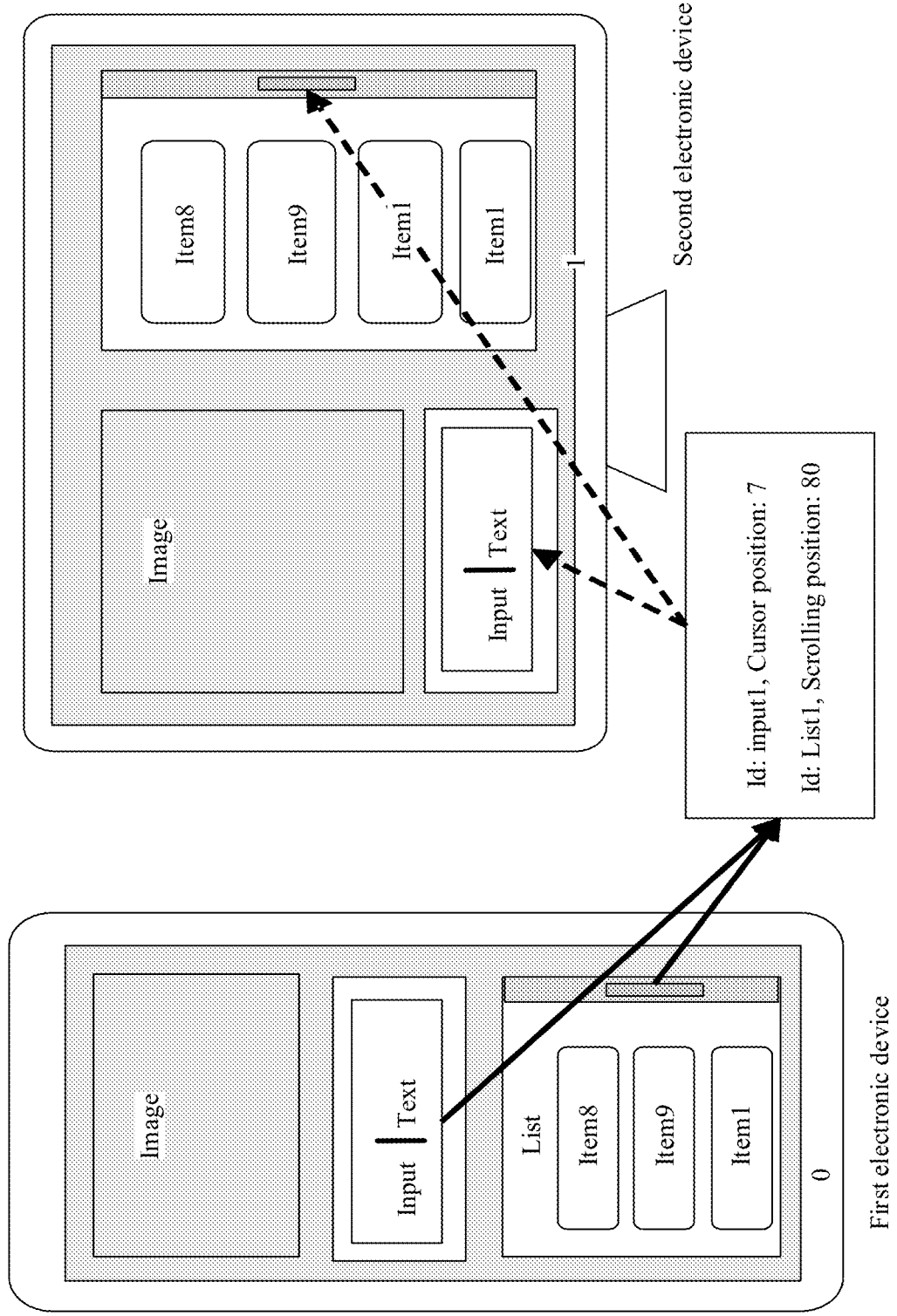
FIG. 9B is a schematic diagram of an interface of component state migration according to some embodiments of the present disclosure.

In FIG. 9B, a first electronic device is a small-screen device, and a second electronic device is a large-screen device. Although the first electronic device and the second electronic device run a same target application, layouts of the first electronic device and the second electronic device are completely different. In this embodiment of this application, a component may be quickly and accurately located by using the component id, and private state information of the component may be restored. As shown in FIG. 9B, on the first electronic device, private state information such as a cursor position in an input box "Input Text" and a scrolling position of a list "List" may be recovered to be consistent on the second electronic device, to implement seamless migration of private states of components without being affected by the layouts of the two electronic devices.

S810: The second electronic device refreshes, on the first page, a component view related to the UI binding data and the target component.

S811: The second electronic device sends a notification message to the first electronic device.

The notification message is used to indicate that a UI page on the first electronic device is successfully migrated to the second electronic device.

Optionally, when the second electronic device recovers the page routing data, the UI binding data, and the component state data, if any recovery fails, the second electronic device sends a notification message to the first electronic device, and the notification message is used to indicate that the migration fails.

In the method procedure described in FIG. 8A and FIG. 8B, data communication is performed between the first electronic device and the second electronic device by using the distributed service, and does not depend on a data center. Based on point-to-point transmission, efficiency of following page migration can be improved. In addition, before the migration is initiated, data in the shared data segment is effectively selected based on the scenario information of the first electronic device, so that an amount of transmitted data can be reduced. In an entire process, complete UI component information does not need to be serialized, so that a migration speed is faster. Before recovering data, the second electronic device performs integrity check on the data, to ensure that the data is not tampered with, and ensure normal recovery of the data. Page recovery is performed based on the recovery routing stack and the current page routing stack, so that seamless migration and recovery of a page between two routing stacks can be ensured, and a mechanism of associated management between a recovery route and an original route is implemented. In the entire migration process, point-to-point migration of a UI component on different electronic devices is implemented.

The foregoing descriptions are merely embodiments of this disclosure, but are not intended to limit the protection scope of this application. A person of ordinary skill in the art may further make improvements without departing from the inventive concept of this application, but all these improvements shall fall within the protection scope of this application An embodiment of this application further provides a computer-readable storage medium. The computer-readable storage medium stores instructions. When the instructions are run on a processor, the method procedures shown in FIG. 5, FIG. 6, or FIG. 8A and FIG. 8B are implemented.

An embodiment of this application further provides a computer program product. When the computer program product runs on a processor, the method procedures shown in FIG. 5, FIG. 6, or FIG. 8A and FIG. 8B are implemented.

Methods or algorithm operations described with reference to content disclosed in embodiments of the present disclosure may be implemented by hardware, or may be implemented by a processor executing software instructions. The software instruction may include a corresponding software module. The software module may be stored in a random access memory (RAM), a flash memory, a read-only memory (ROM), an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in an electronic device. Certainly, the processor and the storage medium may alternatively exist in the electronic device as discrete components.

A person of ordinary skill in the art may understand that all or a part of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a RAM, a magnetic disk, or an optical disc.

What is claimed is:

1. An application interface migration method, applied to an electronic device, wherein the application interface migration method comprises:
   receiving a recovery instruction by using a second distributed service, wherein the recovery instruction is used to indicate to recover a user interface (UI) state of a target application on the electronic device, the recovery instruction comprises page routing data and UI binding data, and the UI binding data is bound to a component of the target application;
   in response to the recovery instruction, generating a recovery routing stack based on the page routing data, and loading a first page based on the recovery routing stack and a current page routing stack of the electronic device;
   checking compatibility of the UI binding data based on a declaration field corresponding to scenario information of the electronic device; and storing the UI binding data in a shared data segment of the target application if the compatibility of the UI binding data is successfully checked; and
   refreshing a component view that is on the first page and that is related to the UI binding data.

2. The application interface migration method according to claim 1, wherein the recovery instruction further comprises component state data, and after the storing the UI binding data in the shared data segment of the target application, the application interface migration method further comprises:
   determining a target component corresponding to the component state data in the target application;
   recovering the component state data to the target component; and
   the refreshing a component view that is on the first page and that is related to the UI binding data comprises:
      refreshing, on the first page, a component view related to the UI binding data and the target component.

3. The application interface migration method according to claim 1, wherein the checking the compatibility of the UI binding data based on the declaration field corresponding to scenario information of the electronic device comprises:
   obtaining the declaration field corresponding to the scenario information of the electronic device; and
   when the UI binding data is valid data declared in the declaration field, determining that the compatibility of the UI binding data is successfully checked.

4. The application interface migration method according to claim 1, wherein after the loading the first page, the application interface migration method further comprises:
   checking integrity of the UI binding data;
   if the integrity of the UI binding data is successfully checked, performing the checking compatibility of the UI binding data based on a declaration field corresponding to scenario information of the electronic device; and
   the storing the UI binding data in a shared data segment of the target application if the compatibility of the UI binding data is successfully checked comprises:
      if the compatibility of the UI binding data is successfully checked, determining a UI component bound to the shared data segment of the target application;
      obtaining a first data type required by the UI component;
      determining whether the first data type is consistent with a second data type of the UI binding data; and
      storing the UI binding data in the shared data segment of the target application if the first data type is consistent with the second data type of the UI binding data.

5. The application interface migration method according to claim 1, wherein the loading the first page based on the recovery routing stack and the current page routing stack of the electronic device comprises:
   obtaining first routing data at a top of the recovery routing stack, and moving the first routing data to the top of the current page routing stack of the electronic device; and
   loading the first page based on the first routing data of the current page routing stack.

6. The application interface migration method according to claim 1, wherein the application interface migration method further comprises:
   receiving a back instruction for the first page;
   in response to the back instruction, determining whether the recovery routing stack is empty;
   if the recovery routing stack is not empty, obtaining second routing data at the top of the recovery routing stack, and moving the second routing data to the top of the current page routing stack of the electronic device; and
   loading a second page based on the second routing data of the current page routing stack.

7. The application interface migration method according to claim 6, wherein the application interface migration method further comprises:
   if the recovery routing stack is empty, obtaining third routing data at the top of the current page routing stack; and
   loading a third page based on the third routing data of the current page routing stack.

8. An electronic device, comprising a processor and a memory, wherein the memory is configured to store instructions, and the processor is configured to invoke the instructions in the memory, so that the electronic device performs:
   receiving a recovery instruction by using a second distributed service, wherein the recovery instruction is used to indicate to recover a user interface (UI) state of a target application on the electronic device, the recovery instruction comprises page routing data and UI binding data, and the UI binding data is bound to a component of the target application;
in response to the recovery instruction, generating a recovery routing stack based on the page routing data, and loading a first page based on the recovery routing stack and a current page routing stack of the electronic device;
checking compatibility of the UI binding data based on a declaration field corresponding to scenario information of the electronic device;
storing the UI binding data in a shared data segment of the target application if the compatibility of the UI binding data is successfully checked; and
refreshing a component view that is on the first page and that is related to the UI binding data.

9. The electronic device according to claim 8, wherein the recovery instruction further comprises component state data, and
after the storing the UI binding data in a shared data segment of the target application, the processor is further configured to invoke the instructions stored in the memory, to enable the electronic device to perform:
determining a target component corresponding to the component state data in the target application;
recovering the component state data to the target component; and
the refreshing a component view that is on the first page and that is related to the UI binding data comprises:
refreshing, on the first page, a component view related to the UI binding data and the target component.

10. The electronic device according to claim 8, wherein the checking the compatibility of the UI binding data based on the declaration field corresponding to scenario information of the electronic device comprises:
obtaining the declaration field corresponding to the scenario information of the electronic device; and
when the UI binding data is valid data declared in the declaration field, determining that the compatibility of the UI binding data is successfully checked.

11. The electronic device according to claim 8, wherein after the loading the first page, the processor is further configured to invoke the instructions stored in the memory, to enable the electronic device to perform:
checking integrity of the UI binding data;
if the integrity of the UI binding data is successfully checked, performing the checking compatibility of the UI binding data based on a declaration field corresponding to scenario information of the electronic device; and
the storing the UI binding data in a shared data segment of the target application if the compatibility of the UI binding data is successfully checked comprises:
if the compatibility of the UI binding data is successfully checked, determining a UI component bound to the shared data segment of the target application;
obtaining a first data type required by the UI component;
determining whether the first data type is consistent with a second data type of the UI binding data; and
storing the UI binding data in the shared data segment of the target application if the first data type is consistent with the second data type of the UI binding data.

12. The electronic device according to claim 8, wherein the loading the first page based on the recovery routing stack and the current page routing stack of the electronic device comprises:
obtaining first routing data at a top of the recovery routing stack, and moving the first routing data to the top of the current page routing stack of the electronic device; and
loading the first page based on the first routing data of the current page routing stack.

13. The electronic device according to claim 8, wherein the processor is further configured to invoke the instructions stored in the memory, to enable the electronic device to perform:
receiving a back instruction for the first page;
in response to the back instruction, determining whether the recovery routing stack is empty;
if the recovery routing stack is not empty, obtaining second routing data at a top of the recovery routing stack, and moving the second routing data to the top of the current page routing stack of the electronic device; and
loading a second page based on the second routing data of the current page routing stack.

14. The electronic device according to claim 8, wherein the processor is further configured to invoke the instructions stored in the memory, to enable the electronic device to perform:
if the recovery routing stack is empty, obtaining third routing data at a top of the current page routing stack; and
loading a third page based on the third routing data of the current page routing stack.

* * * * *